US010764252B2

(12) United States Patent
Bone et al.

(10) Patent No.: US 10,764,252 B2
(45) Date of Patent: *Sep. 1, 2020

(54) COMMUNICATING WITH MACHINE TO MACHINE DEVICES

(71) Applicant: Vodafone IP Licensing Limited, Newbury Berkshire (GB)

(72) Inventors: Nick Bone, Newbury Berkshire (GB); Simone Ferrara, Newbury Berkshire (GB)

(73) Assignee: VODAFONE IP LICENSING LTD, Newbury Berkshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/496,860

(22) Filed: Apr. 25, 2017

(65) Prior Publication Data

US 2017/0295143 A1 Oct. 12, 2017

Related U.S. Application Data

(63) Continuation of application No. 15/021,910, filed as application No. PCT/GB2014/052788 on Sep. 12, 2014, now Pat. No. 9,635,057.

(30) Foreign Application Priority Data

Sep. 13, 2013 (GB) .................................. 1316370.4
Oct. 16, 2013 (GB) .................................. 1318339.7
(Continued)

(51) Int. Cl.
*H04W 4/50* (2018.01)
*H04L 29/06* (2006.01)
(Continued)

(52) U.S. Cl.
CPC ............ *H04L 63/04* (2013.01); *G06F 9/4401* (2013.01); *G06F 13/1689* (2013.01);
(Continued)

(58) Field of Classification Search
CPC ....................................................... H04L 63/04
See application file for complete search history.

(56) References Cited

U.S. PATENT DOCUMENTS 8,386,767 B2 * 2/2013 Barriga .................. H04L 12/66
713/152
9,167,042 B1 * 10/2015 Ehrhardt ............... H04L 67/145
(Continued)

FOREIGN PATENT DOCUMENTS

WO WO-2013113162 8/2013
WO WO-2013120225 8/2013

OTHER PUBLICATIONS

Becker, et al,; "The Constrained Application Protocol for Pervasive M2M Communications", PERCOM Workshops, 2012 IEEE, Mar. 19-23, 2012, Lugano, pp. 483-485. E-ISBN: 978-1-4673-0906-6 (Complete Article).
(Continued)

*Primary Examiner* — Michael T Vu
(74) *Attorney, Agent, or Firm* — B. Aaron Schulman, Esq.; Stites & Harbison, PLLC

(57) ABSTRACT

A method and system for communicating between a managed device and a device manager is provided by sending the managed device a message over a first communications channel, and then initiating communication between the managed device and the device manager over a second communications channel in response to the message, wherein the first communications channel and the second communications channel are of different types.

13 Claims, 14 Drawing Sheets

(30) Foreign Application Priority Data

| | | | |
|---|---|---|---|
| May 30, 2014 | (GB) | .................................. | 1409641.6 |
| May 30, 2014 | (GB) | .................................. | 1409643.2 |
| May 30, 2014 | (GB) | .................................. | 1409652.3 |
| May 30, 2014 | (GB) | .................................. | 1409663.0 |
| Aug. 22, 2014 | (GB) | .................................. | 1414997.5 |
| Aug. 22, 2014 | (GB) | .................................. | 1414999.1 |
| Aug. 22, 2014 | (GB) | .................................. | 1415003.1 |
| Sep. 9, 2014 | (GB) | .................................. | 1415925.5 |

(51) Int. Cl.

| | |
|---|---|
| *H04W 4/70* | (2018.01) |
| *H04W 4/14* | (2009.01) |
| *H04W 12/02* | (2009.01) |
| *H04W 88/02* | (2009.01) |
| *H04W 88/06* | (2009.01) |
| *H04L 29/08* | (2006.01) |
| *H04W 28/08* | (2009.01) |
| *H04W 80/06* | (2009.01) |
| *H04W 12/04* | (2009.01) |
| *H04W 12/00* | (2009.01) |
| *G06F 21/60* | (2013.01) |
| *H04B 1/3816* | (2015.01) |
| *G06F 13/16* | (2006.01) |
| *G06F 13/28* | (2006.01) |
| *G06F 13/40* | (2006.01) |
| *H04W 4/12* | (2009.01) |
| *H04W 12/06* | (2009.01) |
| *H04W 52/02* | (2009.01) |
| *G06F 21/71* | (2013.01) |
| *H04L 9/08* | (2006.01) |
| *H04W 8/04* | (2009.01) |
| *G06F 9/4401* | (2018.01) |

(52) U.S. Cl.
CPC .......... *G06F 13/28* (2013.01); *G06F 13/4027* (2013.01); *G06F 21/606* (2013.01); *G06F 21/71* (2013.01); *H04B 1/3816* (2013.01); *H04L 9/0861* (2013.01); *H04L 63/029* (2013.01); *H04L 63/0428* (2013.01); *H04L 63/0442* (2013.01); *H04L 63/061* (2013.01); *H04L 63/062* (2013.01); *H04L 63/08* (2013.01); *H04L 63/0823* (2013.01); *H04L 63/0869* (2013.01); *H04L 63/0876* (2013.01); *H04L 63/10* (2013.01); *H04L 63/166* (2013.01); *H04L 63/20* (2013.01); *H04L 67/1095* (2013.01); *H04L 67/125* (2013.01); *H04L 67/42* (2013.01); *H04W 4/12* (2013.01); *H04W 4/14* (2013.01); *H04W 4/50* (2018.02); *H04W 4/70* (2018.02); *H04W 8/04* (2013.01); *H04W 12/0027* (2019.01); *H04W 12/02* (2013.01); *H04W 12/04* (2013.01); *H04W 12/04031* (2019.01); *H04W 12/06* (2013.01); *H04W 28/08* (2013.01); *H04W 52/0229* (2013.01); *H04W 80/06* (2013.01); *H04W 88/02* (2013.01); *H04W 88/06* (2013.01); *H04L 63/0838* (2013.01); *H04L 2463/061* (2013.01); *Y02D 10/14* (2018.01); *Y02D 10/151* (2018.01); *Y02D 70/00* (2018.01); *Y02D 70/1222* (2018.01); *Y02D 70/1224* (2018.01); *Y02D 70/1242* (2018.01); *Y02D 70/1262* (2018.01); *Y02D 70/142* (2018.01); *Y02D 70/144* (2018.01); *Y02D 70/146* (2018.01); *Y02D 70/162* (2018.01); *Y02D 70/166* (2018.01); *Y02D 70/168* (2018.01); *Y02D 70/21* (2018.01); *Y02D 70/22* (2018.01)

(56) References Cited

U.S. PATENT DOCUMENTS

| | | | |
|---|---|---|---|
| 9,231,759 B2 * | 1/2016 | Chan | ..................... H04L 9/0841 |
| 9,232,524 B2 * | 1/2016 | Tian | .................. H04W 72/0453 |
| 9,369,378 B2 | 6/2016 | Skog et al. | |
| 2003/0123669 A1 | 7/2003 | Koukoulidis et al. | |
| 2006/0251257 A1 | 11/2006 | Haverinen et al. | |
| 2007/0169107 A1 | 7/2007 | Huttunen | |
| 2007/0204160 A1 * | 8/2007 | Chan | ..................... H04L 9/0841 |
| | | | 713/171 |
| 2007/0254711 A1 | 11/2007 | Young et al. | |
| 2009/0138955 A1 | 5/2009 | Vinayakray-Jani | |
| 2010/0177663 A1 | 7/2010 | Johansson et al. | |
| 2010/0199095 A1 | 8/2010 | Ho | |
| 2010/0273450 A1 | 10/2010 | Papineau et al. | |
| 2011/0320802 A1 | 12/2011 | Wang et al. | |
| 2013/0275758 A1 | 10/2013 | Marlow | |
| 2013/0332627 A1 | 12/2013 | Skog et al. | |
| 2014/0079219 A1 | 3/2014 | Yigit et al. | |
| 2015/0110089 A1 * | 4/2015 | Pazhyannur | .......... H04W 48/18 |
| | | | 370/338 |

OTHER PUBLICATIONS

European Examination Report dated Dec. 5, 2019 in corresponding European Patent Application No. 1415925.5.
European Examination Report dated Nov. 6, 2019 in corresponding European Patent Application No. 14 14997.5.
European Examination Report dated Nov. 7, 2019 in corresponding European Patent Application No. 1415003.1.
Open Mobile Alliance (OMA); "Lightweight Machine to Machine Technical Specification"; OMA-TS-LightweightM2M-V1_0-20130912-D_RM; Sep. 12, 2013; XP064164725.
ETSI TS 102 690 V1.2.1 (Jun. 2013); "Machine-to-Machine communications (M2M); Functional architecture"; Jun. 1, 2013; XP014156987.
Exalted; Expanding LTE for Devices; "WP4—End-To-End (E2E) M2M System D4.3 Device Management"; ExaltedWP4D43; Oct. 31, 2012.
Becker, et al,; "The Constrained Application Protocol for Pervasive M2M Communications", PERCOM Workshops, 2012 IEEE, Mar. 19-23, 2012, Lugano, pp. 483-485. E-ISBN: 978-1-4673-0906-6 (Article Abstract only).
European Examination Report dated Sep. 23, 2019 in corresponding European Patent Application No. 14 776 684.4.
Examination Report dated Jun. 23, 2020 in corresponding application GB 1409663.0.
Menezes, et al, "Handbook of Applied Cryptography", 1997, pp. 22-25 and 551-553, CRC Press.
Examination Report dated Jun. 17, 2020 in application GB1415927.1.

* cited by examiner

COMMUNICATING WITH MACHINE TO MACHINE DEVICES

CROSS-REFERENCE TO RELATED APPLICATIONS

This application is a continuation of U.S. application Ser. No. 15/021,910, having a filing date of Mar. 14, 2016, which was a 371 application of International Application PCT/GB2014/052788, filed Sep. 14, 2014, the disclosure of each of which is incorporated herein by reference in its entirety.

FIELD OF THE INVENTION

The present invention relates to a method and system for communicating with devices and in particular with machine to machine devices.

BACKGROUND OF THE INVENTION

Managed devices and in particular machine to machine (M2M) devices may be used in many different situations and incorporated into a variety of different items and hardware. Typically these managed devices will have low computing resources, be restricted in power and have restricted functionality. Nevertheless, large networks of such managed devices may be developed that require maintenance, control and other interaction that require communication with a device manager.

Due to the nature of the managed devices and their limited resources in both power and computing potential, it is often necessary to keep the managed devices powered down, in a reduced power state or in a dormant state until they are required (e.g. to provide a reading or to accept a command). Devices may be scheduled to power up at certain times or intermittently. However, if information is required from such managed devices or if control or other management information needs to be sent outside of such scheduled operation times then this approach has drawbacks. Alternatively, some form of communication between the managed devices and their device manager may be maintained but this requires additional power and bandwidth especially for large networks of managed devices.

Therefore, there is required a method and system for communicating with managed devices that overcomes these problems.

SUMMARY OF THE INVENTION

Against this background and in accordance with a first aspect there is provided a method for communicating between a managed device and a device manager, the method comprising the steps of:
sending the managed device a message over a first communications channel; and
initiating communication between the managed device and the device manager over a second communications channel in response to the message, wherein the first communications channel and the second communications channel are of different types. Therefore, the managed device may be in a dormant or low power stated until communications are required. At this point the device manager may send a wake-up message over one channel or interface that triggers a different channel or interface to be initiated for communications. Preferably, the managed device has a low or lower power requirement for the first communications channel than for the second communications channel.

Therefore, this system may reduce computing, power and/or bandwidth requirements, especially in a network of one or more or many managed devices and signalling between the managed device and the device manager may be reduced but allows a device manager to communicate with any one or more devices on demand. The method may initiate communications between the managed device and the device manager or alter an existing communications channel, for example. The managed devices may be of a type that does not require user intervention or is necessary to monitor or control unsupervised equipment or other hardware, for example. Typically, such managed devices will usually be in communication with a cellular network but will not have voice capability (i.e. a managed device is not a mobile or cellular telephone). Channels within different communication systems (like fixed and wireless) may be considered to be of different types. Channels with different security architectures (including no security at all) may also be considered as being different types. By contrast, channels that are within the same communication system and have the same security architecture (like 2G, or 3G or 4G, or SMS/GPRS/UMTS/LTE, for example) are not considered to be of different types.

Preferably, the first communications channel may be a cellular channel and the second communications channel is non-cellular channel. Cellular communication channels may include those operating on cellular networks including GSM, UMTS, LTE, 3G, 3GPP, WAP, GPRS, and CDMA, for example. Therefore, these cellular communications channels require a network operator or virtual network operator to manage a network of mobile base stations and cells. Non-cellular communication channels use different technology but can include many different types. These may include fixed lines (e.g. PSTN), wireless channels (e.g. WiFi and WiMax), internet channels (e.g. Ethernet) and others, for example.

Preferably, the first communications channel may be secure, or used to carry a secured message.

Preferably, the second communications channel is also secure and has a different security architecture to the first communications channel. For example, the first channel may be insecure and the second channel may be secure (and so has a different security architecture to the first channel).

The security architecture of either or both channels may include any of GBA, cellular bearer security, public/private key or symmetric key security, secured fixed line or other cryptographic security.

Optionally, the first communications channel may be within a first communications system and the second communications channel is within a second communications system different to the first communications system.

Preferably, the message may be an SMS or mobile terminated SMS, SMS-MT, WAP-push, or OMA-push. SMS messages may be particularly efficient. Other message types may be used.

Optionally, the second communications channel may be any one of: transmission control protocol, TCP; user datagram protocol, UDP; cellular; wireless; WiFi; WiMax; wired; fixed line; and telephone line. Other communications channels or interfaces may be used.

Preferably, communications between the managed device and the device manager over the second communications channel may be suspended until the message is received. This further reduces power and other resource requirements.

Preferably, the managed device may be in a dormant state until the message is received.

Optionally, receipt of the message at the managed device may additionally cause communications between the managed device and the device manager over a third communications channel to cease and switch to the second communications channel, wherein the third communications channel is different to the second communications channel. Rather than waking the device up from a dormant state (or in addition), this allows a convenient and efficient method for switching between communication channels. For example, the device may be switched between wireless connections or from or to fixed line to or from a wireless mode. This is one example of altering an existing communications channel but there may be others. The third communications channel may use higher (or lower) computing resources (e.g. power, bandwidth, etc.) when compared with the second or current communications channel. Therefore, this method allows more efficient management of the device and network of devices. It is particularly advantageous to switch from wireless to wired (or fixed line) as this may provide greater bandwidth, reliability, power utilisation or other improvements.

Optionally, the communications may be switched to the third communications channel from the second communications channel automatically. This may be an automatic procedure or may cause a user or other entity to make a manual switch.

Advantageously, the message may be sent to the managed device in response to: an increase in data volume; a request to send the managed device a file over a predetermined threshold; a request for a firmware or software update; an increase in electrical power used by the managed device over a predetermined threshold; and a decrease in data transfer rate below a predetermined threshold. The message may be sent or generated following other scenarios or criteria.

Optionally, the message may be a secured SMS message. For example, it may already be protected using generic bootstrapping architecture, GBA, information such as keys derived by GBA. In other words, the SMS channel may be a secured SMS channel, in which case any type of security information may be delivered, e.g. further key or keys to secure the second communications channel.

Optionally, the message may be an unsecured message.

Optionally, the message may be an unsecured SMS messaged containing generic bootstrapping architecture, GBA, push information. In this case, an unsecured SMS channel is being used and so GBA push information should be included with the message.

The GBA Push Info is described in 3GPP TS 33.223, Section 5.2.1. The encoding is defined in Section 5.3.5. See in particular table 5.2.1.1 and FIG. 5.3.5.1 in 3GPP TS 33.223 V12.0.0 (2013-12) that may be found: http://www.3gpp.org/ftp/Specs/archive/33_series/33.223/33223-c00.zip Advantageously, the method may further comprise the step of confirming authenticity of the message using the push GBA information and wherein communication between the managed device and the device manager over the second communications channels is initiated following successful authentication. This prevents the unauthorised waking-up of managed devices or the unauthorised switching to a different communications channel of these managed devices.

Advantageously, the message is an SMS message, and the method may further comprise the step of determining if the SMS message is sent over a secured SMS channel.

Advantageously, the first communication channel may be used to establish cryptographic material (e.g. a key or keys or a shared secret) to secure the second communication channel. This may include the use of GBA, GBA-push or using the first channel to send a key which protects the second channel, for example.

Preferably, the managed device is a machine to machine, M2M, device. Other managed devices may be used.

Preferably, the communications between the managed device and the device manager may originate at the managed device. In other words, the message or wake-up message comes from the device manager and the communications are initiated by the managed device.

According to a second aspect there is provided a system for communicating with one or more managed device comprising:
 a device manager;
 a first communications interface;
 a second communications interface, of different type to the first communications interface; and
 logic configured to:
  send to a managed device a message using the first communications interface; and
  initiate communications between the managed device and the device manager using the second communications interface in response to the message.

Preferably, the first communications interface may be a cellular interface and the second communications interface may be a non-cellular interface.

Preferably, the first communications interface may be secure, or used to carry a secure message.

Optionally, the second communications interface may be secure and has a different security architecture to the first communications interface.

Preferably, the first communications interface may be configured to communicate with a first communications system and the second communications interface is configured to communicate with a second communications system different to the first communications system.

Preferably, the first communications interface may be SMS, SMS-MT, WAP-push, or OMA-push.

Optionally, the second communications interface may be any one of: transmission control protocol, TCP; user datagram protocol, UDP; cellular; wireless; WiFi; WiMax; wired; fixed line; and telephone line.

Optionally, the system may further comprise a third communications interface different to the second communications interface, and wherein receipt of the message at the managed device causes communications between the managed device and the device manager using the third communications interface to cease and switch to the second communications interface.

The methods described above may be implemented as a computer program comprising program instructions to operate a computer. The computer program may be stored on a computer-readable medium.

The computer system may include a processor such as a central processing unit (CPU). The processor may execute logic in the form of a software program. The computer system may include a memory including volatile and non-volatile storage medium. A computer-readable medium may be included to store the logic or program instructions. The different parts of the system may be connected using a network (e.g. wireless networks and wired networks). The computer system may include one or more interfaces. The computer system may contain a suitable operating system such as UNIX, Windows® or Linux, for example.

It should be noted that any feature described above may be used with any particular aspect or embodiment of the invention.

BRIEF DESCRIPTION OF THE FIGURES

The present invention may be put into practice in a number of ways and embodiments will now be described by way of example only and with reference to the accompanying drawings, in which.

It should be noted that the figures are illustrated for simplicity and are not necessarily drawn to scale. Like features are provided with the same reference numerals.

DETAILED DESCRIPTION OF THE PREFERRED EMBODIMENTS

Figure 1:
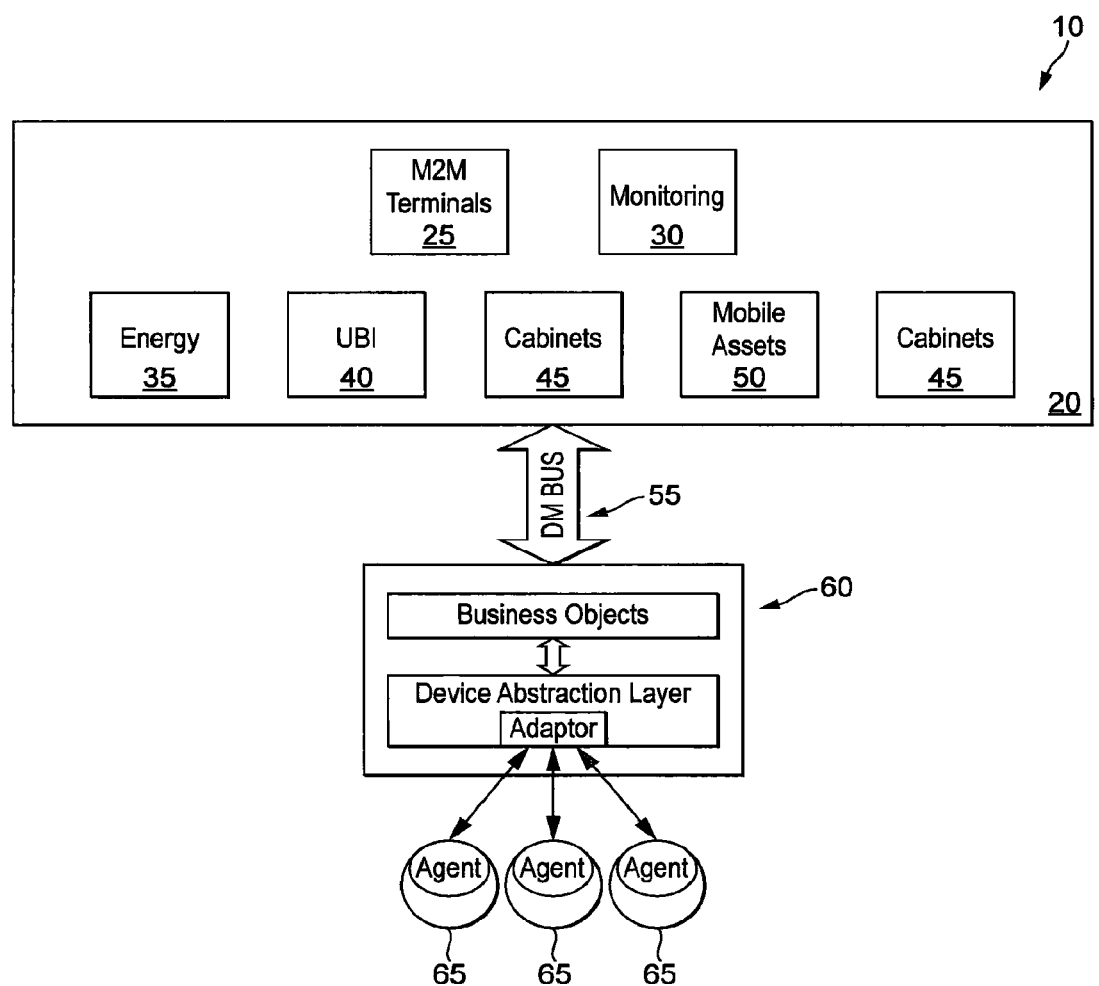
FIG. 1 shows a schematic diagram of an example device management platform including a northbound interface and a southbound interface.

The system may be described as a Device Management 10 platform (as shown in FIG. 1), which may provide a core set of services and mechanisms that can be integrated with customer or user application processes (that may be described as Vertical Applications 20).

The applications may form part of a managed device or machine to machine (M2M) platform or may be separate from it. FIG. 1 illustrates a number of vertical applications 20 all interfacing via a device management (DM) Bus 55 structure with a device manager that may also be described as a Device Management Application Proxy (DMAP) 60. The DMAP 60 may be viewed as an enabling technology that can be used by many different Vertical applications. The Vertical application may be limited to a web platform that can trigger basic Device Management functions, e.g. getter/setters, firmware management, etc.

The DM platform 10 may support multiple vertical application categories and types. The DMAP 60 virtualises physical devices so as to provide a consistent view of those physical devices to the vertical customer or user application. The underlying mechanisms used to achieve this may be transparent to the Vertical Application, and the mechanisms, protocols and data structures used to interface with the physical devices may be part of the functioning of the DMAP 60.

Figure 3:
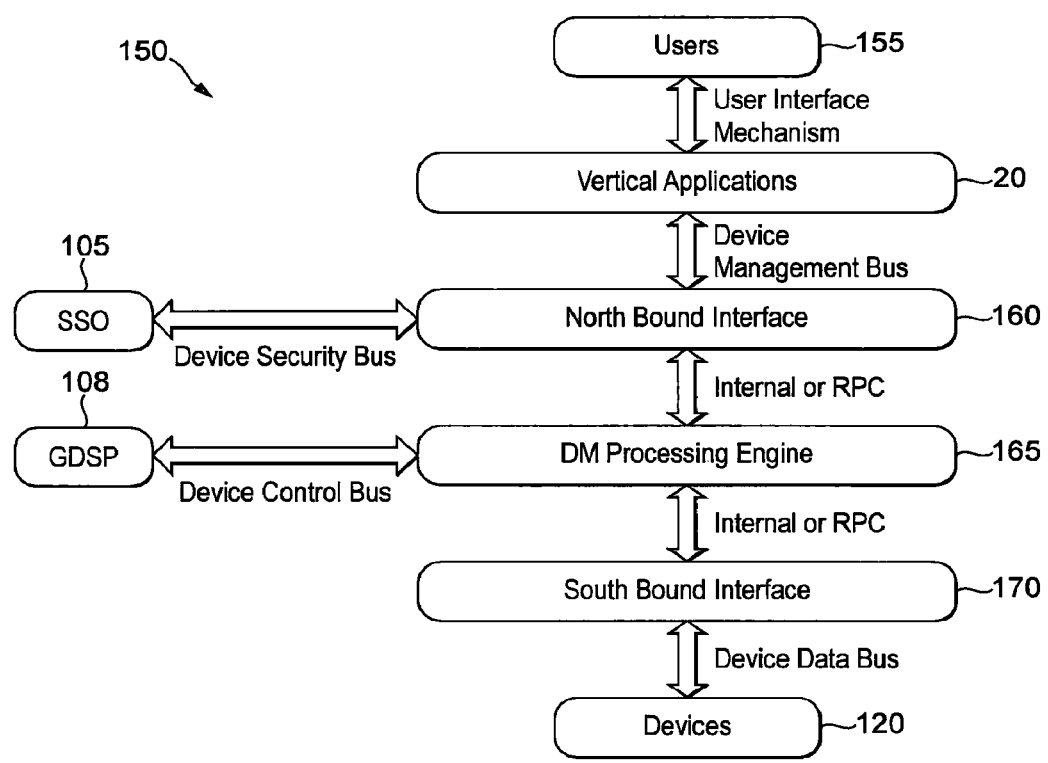
FIG. 3 shows a schematic diagram of a dataflow used to operate the device management platform of FIG. 1.

As illustrated schematically in FIG. 3, the functionality and data flow 150 of the DM solution can be separated into three architectural components:

1. North Bound Interface (NBi) 160 providing communications between the DMAP 60 and vertical applications 20. This will be performed over the Device Management (DM) Bus 55;
2. The DMAP server 60;
3. The South Bound Interface (SBi) 170 providing communications and control to physical M2M devices via the Device Data (DD) Bus.

An alternative way of viewing the architectural model is as a component in an Enterprise Architecture environment, where the Vertical Applications 20 sit above the EA Bus and inter operate with Devices by invoking service orientated architecture (SOA) services using the Device Management Bus 55.

The DMAP Server 60 is designed to be an enabling technology intended to satisfy the requirements of many different Device Management applications. As its name suggests it is an Application Proxy. There are many examples of illustrative applications including machine to machine (M2M) terminals 25, monitoring devices 30 Energy 35, Connected Cabinets 45, ubiquitous computer (UBI) 40, Mobile Assets 45, etc. The Vertical Application 20 may be a web application that allows staff to perform basic Device Management functions. Additionally, a cloud based SaaS approach may be used.

The DMAP 60 may be accessible by third party customers and may manage third party devices/assets, so a deployment may have similar security requirements to other types of Application Proxy. In other words, it may be assumed that the DMAP 60 is an attractive and accessible target for security exploits. The Security approach that is taken is a defence in depth approach using a number of host level security mechanisms not normally used in network elements (file integrity checking, rootkit scanning, security role enforcement, host level firewalling).

Five separate bus structures are described in the following section. Connectivity matrices and firewall (IoD) specifications may map onto these but may be further extended. For example, the DM Bus 55 may be used to communicate with different vertical applications 20 with different security requirements. Therefore, the DM Bus 55 may be separated into multiple physical/logical communications pathways and with appropriate security controls on each.

The DM Bus 55 may communicate with an operator hosted web application that may provide access to the DMAP 60 for use by the operator trusted staff. This may be satisfied with a single VPN connection between the controlling web server (The Vertical Application 20) and the DMAP 60. The DMAP 60 interfaces with the agents 65, which may be components (software and/or hardware) within managed or M2M devices.

FIG. 3 illustrates schematically several types of connectivity:
1) End User interface (top arrow), typically this would be a web based UI, but it could be any mechanism as defined by the Vertical applications 20.
2) Internal Interfaces (arrows two and three from the bottom) connecting the components of the Device Management Application Platform. These may be implemented as accessors to local objects programmatically. Alternatively, an EJB/OSGi type environment based on Remote Procedure Calls (RPC) and serialisation may be used to split these layers across multiple platforms (e.g. a Cloud environment). In this example these interfaces will be described programmatically. In other words, the NBi 160, and DM Processing Engine 165, may run on a single platform.
3) External Interfaces (horizontal arrows, bottom arrow and fourth from bottom arrow) may use connection/connectionless protocols to provide communication functions between the components they support. There are functionally four types of External Interface in this example:
   a. Device Management Bus. Provides communication using web services between Vertical (Head End) applications 20 and the Device Management Platform 10.
   b. Device Security Bus. Provides the full set of AAA services and defines the user roles and security ACLs
   c. Device Control Bus. Provides management API connectivity to an M2M platform. For example, SMS-Wakeups may be invoked over this bus.

Device Data Base

Wired and cellular connectivity to Devices may be used. M2M platform managed devices may support a cellular bearer allowing SMS wakeup and APN connectivity. Some devices may also have additional wired connectivity. The M2M platform connectivity may be considered trusted and any other connectivity should be treated on a case by case basis and should be allocated to a separate security domain. Not shown in the diagram are operations and maintenance (O&M) connectivity requirements. These may be implemented locally or use VPNs over the Device Control Bus, for example. These may include DNS, NTP, SNMP, SYSLOG, SSH and Backup protocols, but additional protocols may be supported as required.

Vertical applications 20 are applications that interface with, manage and manipulate Devices 120 using the Device Management platform.

Vertical Applications may be used by different sorts of user 155 with varying security roles, for example:
  Admin staff responsible for operations for many types of Device
  OpCo Customers responsible for devices owned by their customers
  Customers who own devices that they are supplying to end users to use (for some purpose)
  End Users and persons who use Devices 120.

The Vertical Application 20 that a particular sort of user will use may similarly vary. Types of application might include but are not limited to:
  Admin staff: Monitoring and configuring replication/duplication mechanisms
  OpCo Customers: Monitoring utilisation for billing purposes
  Customers who own devices may use Version Management tools to deploy software upgrades and to ensure they are operating correctly.
  End Users who use devices may use web services that allow them to interact with the Devices 120 that they use.

Many other Vertical Applications 20 may be developed to support the needs of Vertical markets. Example may include UBI, Connected Cabinets, RMCS.

Vertical Applications 20 may communicate with the DMAP 60 over the North Bound Interface (NBi) 160. This is also referred to as the Device Management or DM Bus 55.

The NBi 160 may provide a Bus interface for communicating with and controlling physical M2M assets managed by the DM platform.

The NBi 160 may allow bi-directional communications, between the Vertical Applications 20 and the DMAP's NBi. Communications may use web services and connections may be established by Vertical Applications 20 to the DMAP's NBi or from the DMAP 60 to Vertical Applications 20, for example.

Connections initiated from the DMAP to Vertical Application are referred to as Callbacks.

DM Bus Protocol

Figure 2:
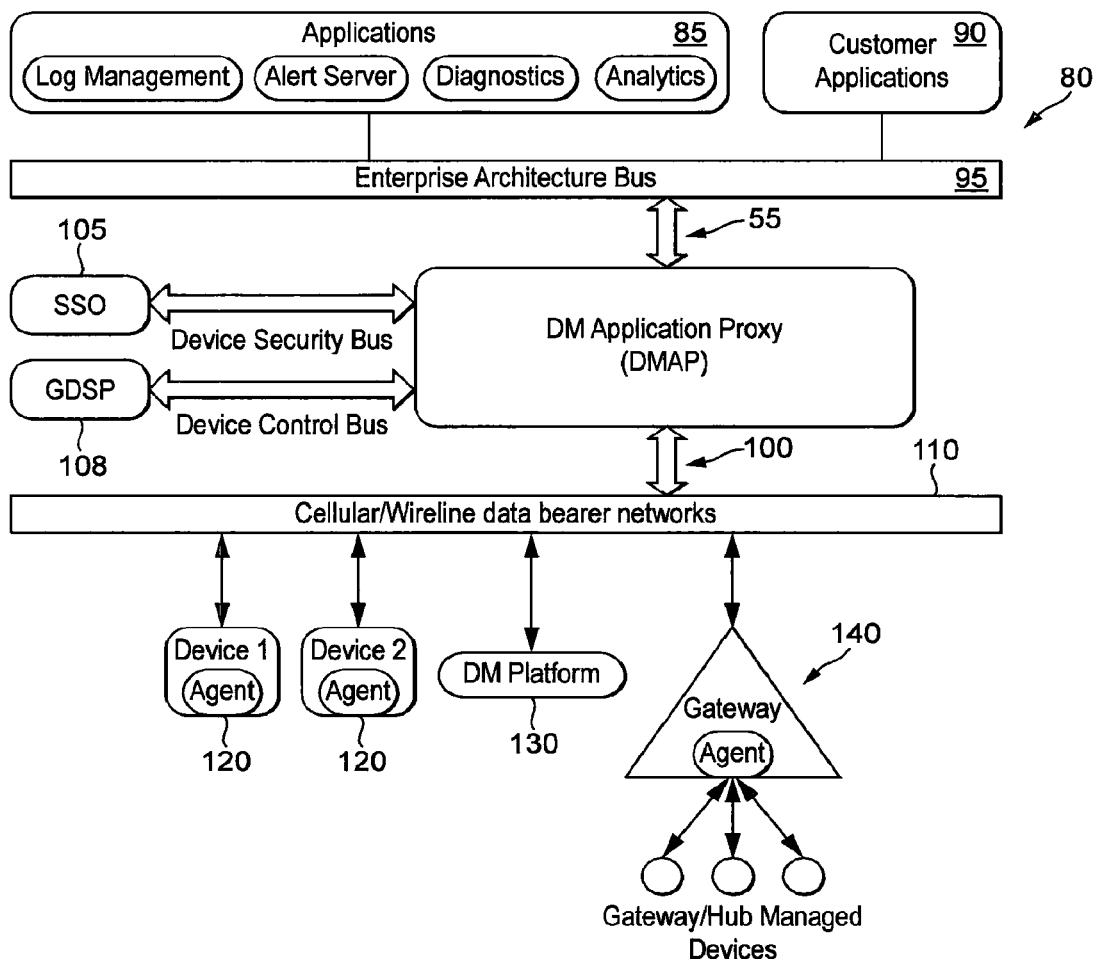
FIG. 2 illustrates schematically a method of using the northbound interface of FIG. 1.

FIG. 2 illustrates schematically a method 80 of using the NBi 160. All data flows across the NBi bus may operate within the context of a connection. A connection may be for the purpose of a single request/response or it may span multiple request/response cycles. The connecting party may perform AAA authentication. Once authenticated, that party may have authorised access to predefined assets under control of the DMAP 60. The AAA mechanism may support all three AAA functions (Authentication, Authorisation, and Accounting).

Management applications 85 may include logging, alerts, diagnostics and analytics. Customer applications 90 may include any of the vertical applications 20 described previously or additional applications. An enterprise architecture bus 95 provides an interface between the applications 85, 90 and the DMAP 60. This may be over an internal or external network, for example. Device security and device control buses provide interfaces between the DMAP 60 and a single sign-on (SSO) 105 and a global data service platform (GDSP) 108 components, respectively. A device data bus 100 may provide an interface between the DMAP 60 and managed devices (e.g. individual devices 120, other DM platforms 130 or one or more gateway hubs 140) over one or more bearer networks 110. These bearer networks may include cellular, wireless or wired networks.

The DMAP 60 may require an administration interface for operations people. For example, this may be used to administer access rights for northbound parties that are later enforced by AAA. An O&M interface may be included but this may be treated as a special case and will go into an O&M Security zone. An admin Vertical application may perform admin type/dashboard functions. Connection management/timeout/queuing issues may be addressed by a standardised admin/kpi capture interface. Assets may be described in terms of data structures where access controls are defined using a role based notation. An authenticated connection may be authorised to have different levels of access to assets using a role based security model. For example, this may use a JSON/XML model where both requests and responses are described using "well formed" data structures (i.e. XML).

In order to comply with security requirements, this application/DM Bus protocol may use SSL encryption based on certificate based authentication mechanisms. Additionally VPNs may be used appropriately to ensure correct separation of data traffic over the DM Bus 55. DM Bus traffic to internal management applications may run over separate VPNs to traffic that passes to third party Vertical Applications 20 on the public internet.

DM Bus Access Mechanisms

There may be multiple types of access supported:

1) DM get/set API—An API mechanism that allows third party applications to make direct queries and issue commands to the DMAP 60 and get synchronous/immediate responses.
2) DM get API—An API mechanism that allows third party applications to make direct queries to the DMAP 60 and get asynchronous responses (two different APIs may be used or one with a flag, for example.)
3) DM get/set http—An http query mechanisms that allow third party web queries
4) Callback—Aysynchronous requests may return data result sets using an XML callback mechanism. This may be via URLs.

Synchronous requests may arise when a query or an action is requested and the results can be returned immediately. Asynchronous requests may arise when queries are requested and the results will be available at a later point in time. Synchronisation may be maintained by a separate or integrated component or function.

Synchronous Requests

Synchronous requests may be used when the result or status of a resulting action is immediately known. If the status is changing then multiple queries may be used to poll the status. Whilst polling is simple, it may not be very efficient.

Asynchronous Requests

This provides a mechanism for dealing with changing conditions or events in a more efficient fashion. When the action resulting from an asynchronous request generates a result, this result may be supplied back to a specified URL and the result data may be encapsulated using an XML notation. This type of request may be used when:

There will be a delay (of possibly unpredictable duration) before the request can be completed There will be multiple responses (result sets) generated. These could be implemented synchronously using cursors (as per SQL) but that adds complexity.

A device sends notifications to the M2M platform (e.g. exceptions or scheduled notifications of sensor data).

Actions to be applied to particular devices or groups of devices may be stored within a storage location within memory (volatile or non-volatile) and then synchronised or applied to the device immediately or after a period of time (either scheduled or as necessary in the immediate conditions). The actions may be to change, add, update or delete a particular value or attribute of a device or to obtain data from the device. Therefore, the synchronisation may be two-way.

The callback mechanism may also be used for sensor data notifications sent from a device. Alerts, sensor data, diagnostics and asynchronous getters may all use the same callback mechanism.

Callback Mechanism

The URL callback mechanism may be implemented as a setter mechanism where the action requested will be communicated back to the invoking Application by means of a specified URL. The advantage of this approach is that it makes very efficient use of resources and can be used to describe sophisticated behaviours in a simple fashion.

Callback—OneTime Result

Asynchronous Requests may be used where a single action is being requested and there may be an unknown time delay between the request and the action. For example, a command to Lock and Wipe a device may only be performed after the DM platform has established contact with the identified device. If the device is turned off it may take some time before the operation is completed (or timed out).

Callback—Multiple Results

Asynchronous Requests may be used where there will be more than one result. This could be no result or potentially an infinite number of results. An example may be a query for devices with a low signal level. There may be a varying number of devices that satisfy this request, returning results over an extended period of time. The callback mechanism provides a mechanism to transfer this sequence of responses in a relatively simple fashion.

Callback—Log Results and Sensor Data

Sensor data results may be supplied to a controlling application by means of the callback mechanism. The requesting application may describe the sensor data of interest, the conditions that will cause it to be supplied and the URL callback to pass this sensor data to. Note: Multiple applications may potentially view the same sensor data, simply by describing multiple callback requests.

Callback—Alerts

Alerts may arise when some event occurs that need to be recorded and the information describing the event needs to be communicated. An alert may be how you describe a trigger that will cause the alert to be generated. The triggering condition could be simple, e.g. a data field has a specific value, or the value enters a specified range.

Alerts and Sensor data shipment may be implemented in the same way. The scheduled shipment of sensor data may also be regarded as Alerts.

More sophisticated alert triggers may be specified with multiple conditions being combined using Boolean logic.

Callback—Diagnostics

Conceptually these function in a similar same way to Callback Alerts. The only difference will be how a diagnostic alert is defined. Diagnostics may be of interest to support organisations with Helpdesk $1^{st}$, $2^{nd}$, $3^{rd}$ line support responsibilities. Diagnostics mechanisms may be managed by Applications 20 under the control of this type of Organisation.

Callbacks—Specifying Triggers/Action Pairs

An application may request asynchronous activities (Callbacks) by invoking requests with the URL describing where callback data responses are to be sent. Callbacks for sensor data, alerts and diagnostics may use this same mechanism and may perform their functions by specifying a callback with a trigger condition. The trigger condition and consequent action form a pair. This API may contain:

Callback-URL—where callbacks pass data when the trigger is fired

XML definition of Data Structures to be passed into the URL when the trigger is fired XML definition of the trigger that will cause a Callback to be fired. This trigger definition may consist of a set of conditions and Boolean relationships between conditions.

A name for the trigger/action pair—once the trigger/action pair has been defined and named—may be assigned to specific devices or/and collections of devices.

Using Callbacks

The callback parameters may be specified in a single API call, or alternatively one can use previously defined and named definitions of:

The data structures to be passed in the URL

The trigger specification.

In the case of Alerts, diagnostics and sensor data and the named callback plus trigger specification may be associated with a device in one of three example ways:
1) Device Type, all Devices of a specific type.
2) Device Version, all Devices of a specific version.
3) Device, on a Device by Device basis.

When a Device's instance data (a programming term describing the data objects assigned to an object—the object may be a virtualised device object) changes it will first process all callbacks associated with that Device, then it will process callbacks specified at Device Version level and finally it will process callbacks at Device Type level. All callbacks may be named. Once a named callback has been actioned, callbacks with the same name at higher levels (Device Version, Device Type) may not be triggered.

This approach of using named data structures and triggers offers the ability to modify returned data structures and triggers dynamically, without the need to modify application programs, or even the need to restart those applications.

Use case examples:
A customer application describes a Trigger list which is a set of conditions that indicate a device is faulty. These conditions are defined in terms of values that indicate a device has a specific fault (the trigger list). Values are examples only. Any value may be set and different conditions may be used.
Power level <12,
Device version 2.56,
Temperature reading >34
A callback is defined into the customer's web service platform. This definition includes the:
Webservice URL
Username/Password credentials to get access to the customer application
Data structures that will be communicated across to the web service URL
An Alert/Diagnostic is created in terms of:
Device Types,
Trigger Lists
Callback.

The Callback method may be an advantageous way of integrating with Customer Applications 20. An alternative may be Synchronous getters that poll.

The last step in this Use Case may cause the Alert/Diagnostic to be associated with the Device Instance structure representing the Device Types. If an Alert/Diagnostic already exists then it may be overwritten with this new definition.

This approach allows the Alert/Diagnostic to be specified for a single device, a collection of devices at the same version level or all devices of a specified Device Class.

A named trigger defined to detect a device with a specific hardware error, might be refined over time to trigger under different circumstances. Over time, support personnel or an automated system may refine the trigger, so it is more selective and accurate in identifying a specific fault, condition or criterion. Once modified, the trigger may be activated and all applications using that named trigger may start to receive callbacks for devices that match the new and refined triggering conditions.

This trigger/action mechanism will allow the support team to create an increasingly sophisticated diagnostic/alerting capability by refining the triggers over time. As new faults are diagnosed or other criteria met, then triggers may be (re)defined to be more specific and selective.

Similarly when defining the Alert/Diagnostic, it is possible to define it for individual devices, or devices at specified versions or for all devices of a specified type.

The Northbound API may have any one or more of the following:
An API specification that is usable for the third parties using the Northbound interface 160 may be provided
The set of APIs may be extremely simple GET and SET with asynchronous variants. The complexity and detail may vary and depend on the Objects that can be GOT and SET, e.g. the Device's data model.
The Northbound Interface 160 may be any one or more of:
SOAP-based remote procedure call interface
RESTful interface based on http and resource URLs
Web Services interface using SOAP
JSON
Other
Remote Procedure call (RPC)—this may result in very close coupling between applications 20 and virtual devices which may form part of an open service gateway initiative (OSGi) type solution.
Get/Set APi and Get/Set Http. These result in a similar function but includes support for asynchronous updates.
The callback structure may scale. The NBi 160 can be distributed between multiple DMAPs and multiple North bound verticals.
The Northbound interface 160 may act as a SaaS interface to vertical applications.
The Get/Set API or Northbound Interface 160 may use an API offered to users or customers by a cloud server (e.g. Sierra Wireless's cloud service). SNMP may use the same approach but where callbacks are implemented using trap servers. Using web services to communicate between applications in both directions can be used for managing bi-directional flow of information between web service aware applications.

The DMAP Server

The software may be hosted in a Cloud. Cloud, master/slave, proxy and forwarder configurations can be used.

The Device Management Application Proxy 60 may use declarative mechanism to describe all operations, objects and actions. Each DMAP Server may manage:
Collections of managed devices 120 that may be of many different types and/or versions
Device discovery mechanism so that connecting devices can be added to managed device estates (device or user driven).
Device registration/deregistration mechanism so that devices may be placed into alternative states.
Firmware images and the logic/data structures necessary to perform firmware update operations to collections of devices of different types and/or versions (the server may get firmware images from a NBi function, for example.) The Data model for the device may need to support firmware versioning. A software image may be considered as an item on the data model, that will have a version AND a setter function to initiate the load and install the firmware. The same may apply to application software residing on the device.
Application Software images and the logic/data structures necessary to perform application software update operations to collections of devices of many different types and/or versions. Cataloguing and managing which software is installed on each device is a higher level vertical application (head end) function.

Callbacks and the specification and security credentials for those callbacks to operate.

Triggers and the description of the triggering conditions or criteria necessary to cause a device to cause a trigger to be activated.

Device/Callback/Trigger mapping to support the generation of appropriate Alerts, Diagnostics, Logs, and Sensor data events and event data to be transferred to registered callbacks.

Figure 4:
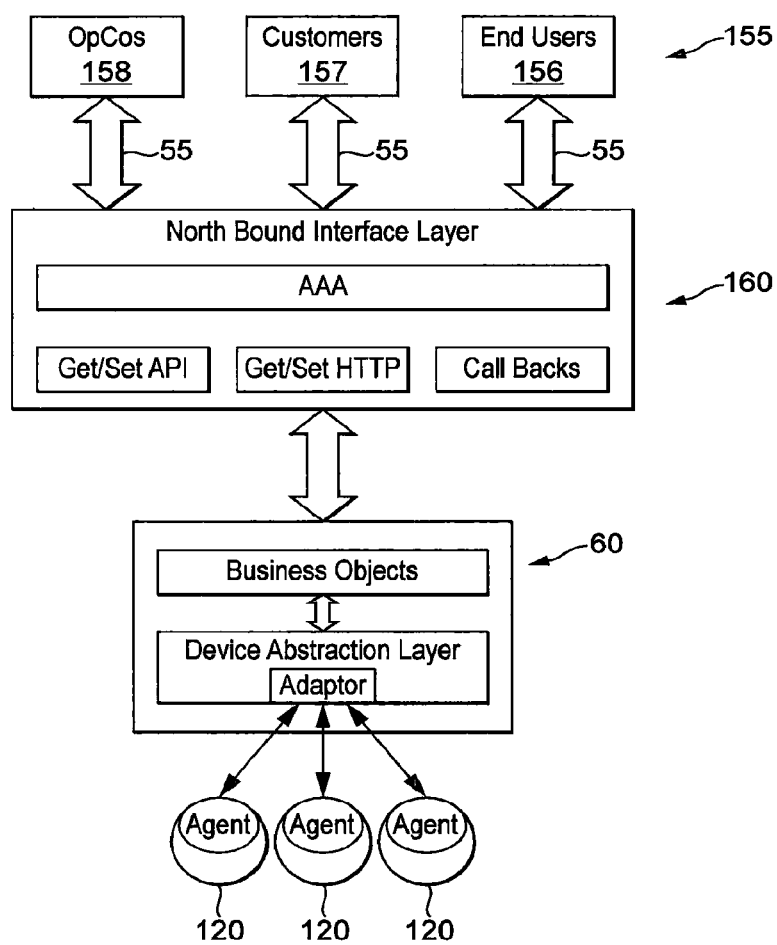
FIG. 4 illustrates schematically the interaction of various user types with the northbound interface of FIG. 1.

FIG. 4 illustrates schematically the interaction of various user types with the NBi 160 over one or more DM buses 55 in order to provide a route into the DMAP 60 for controlling and monitoring the devices 120. Users 155 may include end users 156, customers 157 and OpCos 158, for example.

Figure 5:
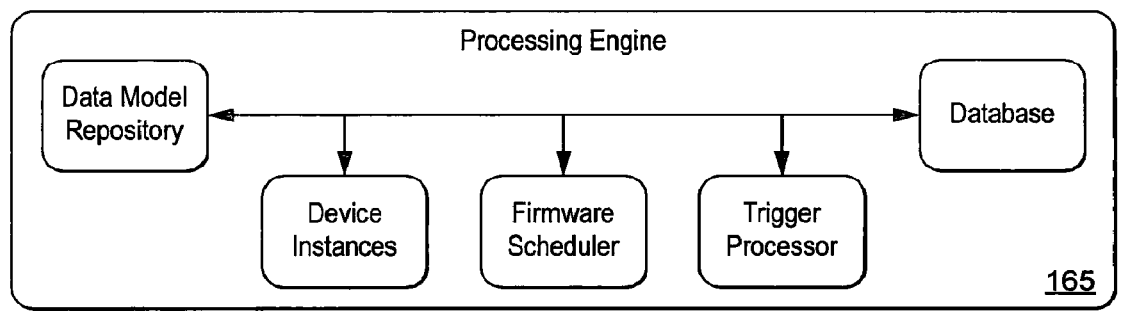
FIG. 5 shows a schematic diagram of a processing engine of the device management platform of FIG. 1.

The DMAP server's Processing Engine 165 may be limited to a small set of simple processes. An example implementation is schematically shown in FIG. 5. These can be implemented as multiple threads of activity or single threaded processes executed in sequence. The processes can access the Device Instances and synchronisation mechanisms may operate at device instance level (i.e. the processes may not have any visibility of them).

Device Instances

Each physical device 120 managed by the DM Server may be instanced. These Device Instance data may contain all the latest information pertaining to a physical device 120 and may be thought of as a virtualisation of a physical device 120. The contents of the Device's instance data may be referenced using the North Bound Interface 160 using any of the getter/setter mechanisms.

Setters are not limited to setting data values, but they may also support the ability to invoke commands. For example, a Data Variable instance representing wipe/lock, may be used to support the Wipe/Lock mechanism by performing a setter operation of lock (or lock and wipe) on the Device Instance variable representing wipe/lock.

The Device Instance data may have a reference to a Device Class Object, (i.e. there may be a single Device Class Data object for each Device type). These data may also include references to a Device Version instance (see Device Version Instancing section) Object.

The Device Version object may contain a data structure that describes the Data Model used by Devices at the specified Version Level.

Thus a Device Instance may have a reference to a Device Version Object that may contain the Data Model used by all Devices of that Device type and Version. These data structures and relationships may support mechanisms necessary to transition Devices between Versions of Firmware, for example.

Device Instance Data Model

A device data model may be defined given a-priori knowledge of the device data models used in TR-069 and OMA LWM2M (as well as other example protocols). The later development of adapters may therefore become more straightforward. This maps directly onto the LWM2M TR-069 and SNMP MIB data models. Additional features and structures may be included.

In this example, the model works at any one or more of four levels:
1) The Vertical Applications view
2) The DMAPs view
3) The protocol (LWM2M) view
4) The device view Each level may have different requirements but preferably a single XML definition of the device data model may be used and from that the necessary structures for the different levels may be generated (see SDK Data modelling tool).

Device Instance Data may be defined using a Data Model, where each Version of each Device may have a Data Model associated with it. This Data Model may take the form of an XML defined tree structure (for example), where each node on the tree describes either a data element of a specific type with defined attributes and meta information associated with it. Alternatively, it may be a branch node on the tree of data elements.

Figure 6:
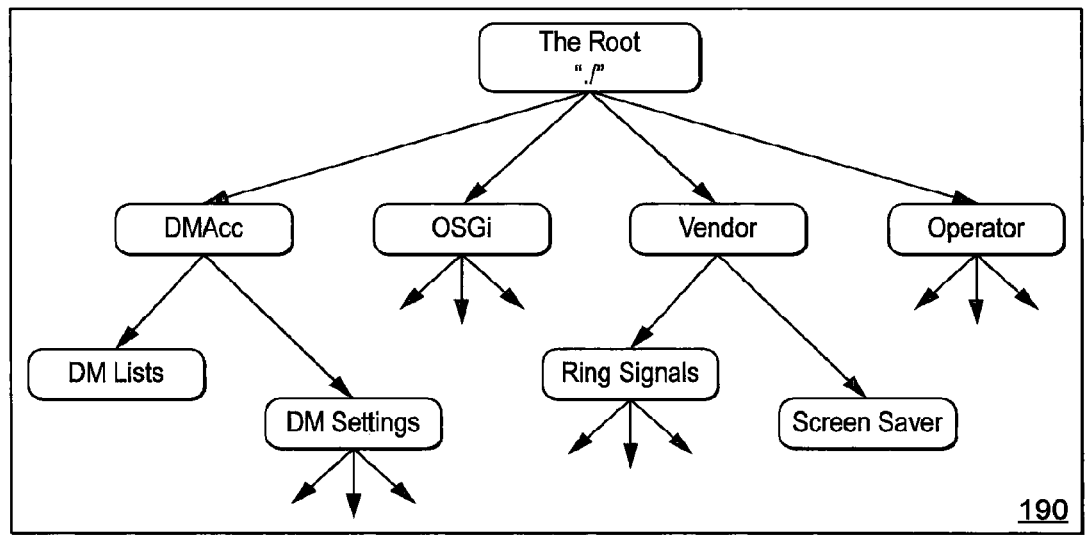
FIG. 6 shows a schematic diagram of an example data model used in the device management platform of FIG. 1.

FIG. 6 shows a schematic diagram of an example data model 190. In this figure the Screen Saver is shown as a Leaf node describing a Screen Saver Object. This could be a string type containing a reference to a file that is the screen saver, or it could be of type Binary Large Object (BLOB) and contain the binary data contents of a JPG or other image file, for example.

The Ring Signals node is shown as a Branch Node and in this example may contain references to multiple different Ring Signal data objects.

Data Model meta information may contain a number of attributes which may constrain how the Device Instance data will be used, this may include (but may be extended):

Security Roles—There may be multiple Security roles assigned to each data item described in the Data Model, where the roles will constrain the access rights allowed by different actors when interacting with a Device's instantiated Data Items. Security Roles may be inherited, thereby allowing a high level branch node structure to own the Security definition for all Data Items subordinate to it.

Default values—these may be used for serialisation and when instantiating data items for the first time (supporting transitioning between firmware versions).

Valid Ranges of Values—these may be used for data normalisation (required to support Data Analytics)

Primary/Secondary Validation—these may be used by a developer of the device to define the valid ranges of values a device can hold. This allows the data modeller to describe the legal or valid values of data that can be held in a data element Serialisation Rules—Describing how a data item will be replicated/cloned Timeliness Rules—How frequently this data item needs to be updated Complex Objects Architecturally the Data model may have a hierarchical structure. This can be represented using a relational data base system, meaning that the developer can use a database if required. However, it may be preferable for the developer to design a data model intelligently.

Figure 7:
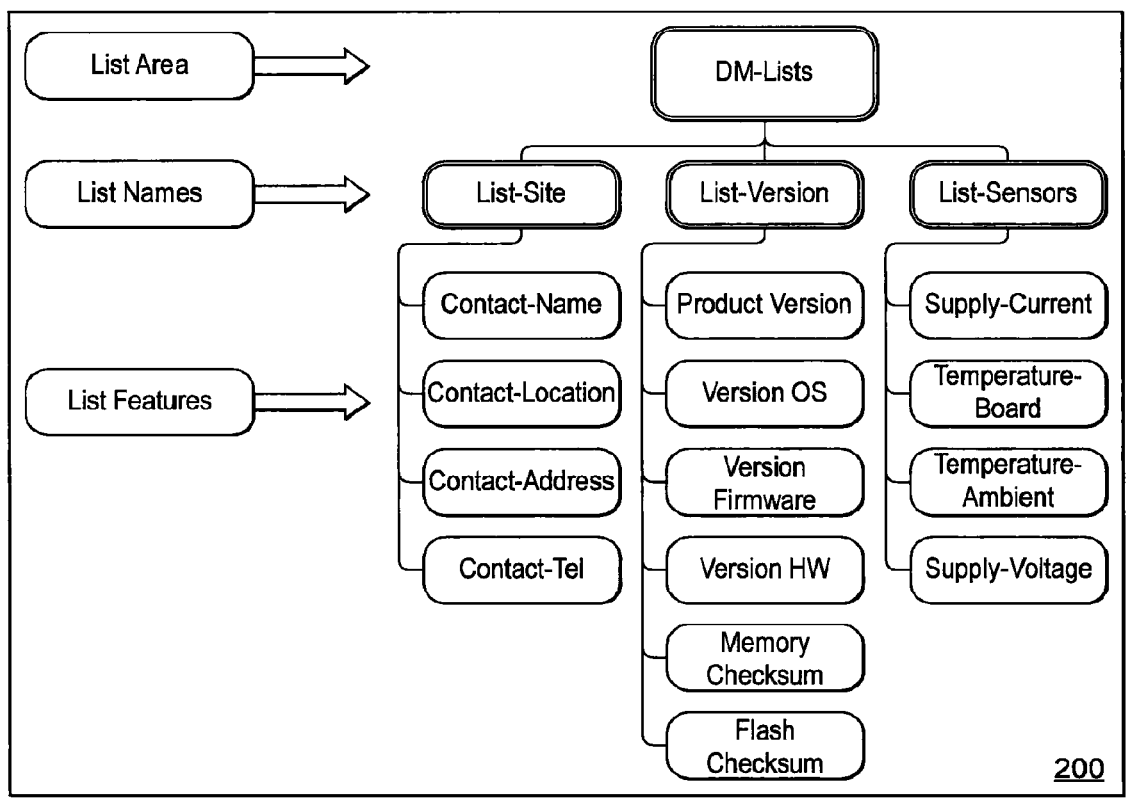
FIG. 7 shows a further example data model.

The Data Model 190 allows the developer to represent collections of related data structures as though they were single data objects. FIG. 7 shows a further example data model 200. In this example, the object DM-Lists is a list area and references multiple list structures (e.g. list names that each has list features). Each of these lists represents different categories of data objects.

The advantage of grouping collections of different data items in this way is that data structures with similar uses can be manipulated collectively as though they were single objects. As shown in this figure, three example list structures are shown to have different security roles.

Device Data Model—Meta Data

The device data model allows the developer to describe all the data items associated with a device, in terms of the names, types of data, default values, and valid ranges of values (i.e. for normalisation, validation and optimisation of analytics processing).

Device data models may take three forms in this example:

Class model—where the data model for a class (or type) of device is provided;

Group model—where the data model for a collection of devices is provided (where the collection of devices is defined in some arbitrary fashion). Note, a Device may be included in multiple Group models; and Instance model—where the data model is specific to a specific physical device.

The precedence of the multiple models may follow Class-Group-Instance, where instance overrides group which overrides class.

As well as the data type information, the data model may support other types of meta-information about device data items and device capabilities. This may include:

Informational and descriptive. This can be used in a mundane fashion simply to document device capabilities and behaviours and may reference other sources of information and documentation relevant to the device. It has interesting applications when considering interactions between different device types, and taxonomical systems for describing devices. A use case may be an iBeacon (or similar) enabled device that recognised specific types of devices and when an iBeacon detects a device that it recognises and that it may interact with. Example use cases of this include use in cars, tolling systems, and car parking systems.

Timeliness. This information may be used to describe the criticality of a data item and how frequently the Device Manager should attempt to update the information—An example may be meter readings from a Power meter where at least one meter reading is required in a 24 hour period. Including timeliness meta-data attributes allows connectivity systems to operate in concert with the physical devices, to automate the data collection activities and for optimisation (e.g. operating during times of low cellular activity). Additional meta information may be included to describe alerting actions to invoke in the event of a specific data item's timeliness requirements not being met.

Security access control and role definitions. This meta data may be used to populate associated policy stores used to provide authorisation and access control security mechanisms.

Security integrity/confidentiality requirements. Additional security requirements may require the use of meta data to describe security management rules and activities for the different types of data. Using the declarative approach offers a generic solution which can meet these security requirements. This may include:

encryption mechanisms for different levels of confidential material;

malware scanning for binary data (in and out);

application/device level confidentiality mechanisms for specific types of data item (e.g. Javacard). This allows the device developer to engineer in mechanisms supporting the transfer of data and applet code to and from devices in a secure fashion;

Primary/Secondary Validation—These may be used by the developer of the device to define the valid ranges of values that a device may hold. Exception handling rules may also be defined, and these may support default values and alerting actions.

Publishing rights. This may be higher level information used to describe and constrain how device data are used. This may go beyond Read/Write/Delete and may be more generic by describing how data items can be used and shared with other systems. An example use case would be a Connected Cabinet device dispensing soft drinks. If a device's dispensing activities were publically publishable, this may provide valuable analytics information about wider population behaviours. For example, the number of cans of drinks consumed per hour may correlate with and be used as a predictor for how many burgers a burger chain will sell in the next 30 minutes. The declarative data model approach allows the device user to decide whether device data can be used by third parties to support these "higher value" analytics requirements.

Monetisation of data for analytics purposes. The declarative model allows the users of a data point to understand the value of the data point for analytics purposes (for example, using the previous "fizzy drink can dispenser" use case.) When performing analytics the analytics algorithms may analyse and assign "weights" to different data points where the weight may indicate the value of the data point in predicting some value. The weight assigned to data items associated with a fizzy drink can vending device might (for example) be high in predicting burger sales but low in predicting the price of coffee on the Futures markets. These weights may then be used to determine the individual and overall value of a data point as an analytics predictor. This presents an opportunity to place a value on the data item and offer the owner of the information represented by the data point an incentive to disclose the data item for third party analytics use.

Storage/Disclosure requirements. This is related to Publishing rights meta data, and is limited to defining how and where a data item's values may be archived and stored. This meta information may be used to control, manage, monitor and enforce privacy requirements.

Processing Clues & Optimisation hints. This is low level information that can be used by physical devices (and the authors of software running on those devices) to describe how data items may be processed. An example use case would be a temperature measurement averaged over a precise period of time (e.g. a moving average). To calculate moving averages you need to store a record of the last n values captured (where n describes the number of previous values used to calculate the moving average). If the Device Manager platform were to attempt to do this, it may need to be continuously sampling the information being averaged (which would be expensive in connectivity and computing terms). By defining the way data items are being aggregated as part of the declarative data model, this allows the device developer to describe low level device behaviours that may be implemented automatically on the device. (This assumes that the agent software on the device has been implemented to understand these declarative hints).

Serialisation Rules—Describing how a data item may be replicated/cloned. These may be used by resiliency mechanisms to prioritise which data items are important and also the technical mechanisms used to facilitate replication and cloning.

Versioning information. Software and/or firmware updates may be supported but such activity may be difficult to manage especially during software or firmware release transitions as this may involve changes to the data model. An example would be where a new data item is introduced for the next release of a device's firmware. The meta-data describing this new data item can include information describing how the new data item will be introduced and be transitioned between releases.

Additional Topology Requirements. Data models for representing hub devices may require the ability to "plug in" devices in unpredictable or ad hoc ways. This use case involves an M2M wireless mobile router known as Machine Link 3G (ML3G). This is a hub device that provides Ethernet connectivity to other devices (of any type). Potentially this connectivity could include connectivity to other ML3G devices resulting in a multitude of potential topological models comprising tree, star, and mesh sub networks, for example. Meta data may be used to describe device connectivity attachment points and these attachment points should provide simple links to equivalent DM structures representing an attached device. This relatively simple approach implies that:

every Internet of things (IoT) device that attaches to an ML3G may have its own Data Model describing the device;

the logical inter-relationships of attaching devices may be represented using bi-directional links between parent/child attached devices using the DM data models;

physical communication of attached devices to the DM platform may be mediated using (some as yet undefined protocol via) the parent ML3G device.

The following application example maps Feature Lists onto OMA-DM data structures. In this application example the M2M product designer has developed an M2M device for monitoring the 12 Volt power supply to a low voltage consumer appliance. To facilitate use of the appliance he has created three feature lists:

List-Site—Contains customer location and contact details. This list contains security sensitive information (the customers' details) so in normal use would only be used by applications requiring knowledge of the customers' details.

List-Version—Contains all the items describing the version of the M2M software and hardware. This list would typically be used when performing diagnostics and when applying software updates, patches and fixes.

List-Sensors—This list contains sensor data specific to this device.

Defining Feature Lists

The designer of the device will specify the feature lists supported by the device. This specification will describe how the data is mapped from the device into the feature list data structures and this mapping will be described in an appropriate fashion (ie using an XML declaration notation). For example, a temperature sensor reading may be mapped into the List-Sensors feature list described above. In the example there are two different temperature sensors, one is a board sensor intended to measure the temperature of the M2M device and a second sensor designed to measure the ambient room temperature.

Mapping of the data items into the feature list may also involve some data processing, in the case of the temperature sensor the mapping might involve taking the average of a series of readings, or a maximum value reading. Irrespectively, the mechanism allows the device developer to specify which features are available to different applications in a way that is role specific.

Using Feature Lists

Different applications may make use of different feature lists. The example above describes a device with three different feature lists intended to be used by three different sorts of application, each with different security access rights. A third party company providing a service managing the firmware/software update mechanism may need access to the Version Lists for each device. This allows the company providing Over the Air (OTA) updates a mechanism to confirm the version details of devices that need updates. The third party company does not need to know what the various fields mean in the Version List. All it needs to know is that the contents of the Version List need to match the Version info for a particular version of software prior to commencing the Update process.

The same approach can be used for diagnosing device defects, the company managing the device diagnostics process needs no knowledge of the contents of the feature lists, all it needs is a way to map different feature list values onto actions to take.

By abstracting out the identity of data values and what they represent, it is then possible to make use of advanced analytics on the feature list data, using supervised and unsupervised machine learning techniques. The organisation performing the analytics on captured device data, does not need to know what the various features represent, instead all they need to know is the type of data, and ranges of values. From this information alone it is possible to identify which features in a feature list are important in predicting future results and trends.

Using Time-Series Data in Feature Lists

Using the example Feature Lists above, there is a feature list called List-Sensors. Ordinarily this would be processed simply be "GET" ting the current feature list values. A more advanced application of feature lists supports the use of time-series data, whereby a feature list item was created periodically (i.e. once every 10 minutes).

A multiple row (instance) feature list data structure may support the use of a set of feature list values. This would provide the application with a mechanism to collect data that had been acquired over a period of time.

A set of sensor values may be captured every 10 minutes (or another interval) and an application would "GET" this data for processing and analysis twice a day. Using a multi-row feature list, the device developer may append the most recent set of sensor values into the multi-row feature lists. Applications querying these data may have the ability to select individual values or ranges of values.

Feature Lists provide a mechanism for describing how data maps onto role specific data structures. Many of the mechanisms to describe and access these data structures are borrowed from set theory and relational database technology. By providing a declarative mechanism to describe how collections of data will be organised and arranged within a device (e.g. M2M) environment, it simplifies the tasks involved in making use of that data. As well as simplifying the application developer's job, it also simplifies the security process because in both cases, the Feature List data structures may be used and secured using a role based approach.

A consequence of this abstraction process is that there is no longer a requirement for data processing activities to have knowledge of how data is organised, because the data will always be "served up" in the same way to the application developer. The developer no longer needs to understand how the data is generated on the appliance or even what the data represents. An output from a temperature sensor is just a number for processing and the processor of that data does not need to know it is a temperature reading that might indicate a fire is about to start. Instead, the processor of the temperature reading will just see a number that is exceeding a maximum value that in turn may trigger an alert process appropriate for automatically initiating a call to the emergency services.

Data Analytics

Different applications may make use of the different lists in different ways. The example of FIG. 7 shows a device with three different lists intended to be used by three different sorts of application, each with different security access rights. A third party entity or company providing a service managing the firmware/software update mechanism, may need access to the Version Lists for each device. This would allow the company or entity providing Over the Air (OTA) updates a mechanism to confirm the version details of devices that need updates applying. The third party company does not need to know what the various fields mean in the Version List. All it needs to know is that the contents of the Version List needs to match the Version info for a particular version of software prior to commencing the Update process.

The same approach can be used for diagnosing device defects, the company or entity managing the device diagnostics process needs no knowledge of the contents of the feature lists, all it needs is a way to map different list values onto actions to take, by means of the trigger/action callback mechanisms designed to support device diagnostics.

By abstracting out the identity of data values and what they represent, it is then possible to make use of advanced analytics on the list data, using supervised and unsupervised machine learning techniques, or other analytics for example. The organisation performing the analytics on captured device data does not need to know what the various data items represent. Instead, all they need to know is the type of data, and ranges of values (available via the Device Instance Data Model reflection mechanisms). From this information it is possible to identify which features in a list are important in predicting future results and trends.

Data Model SDK Activities

Device Data models can contain many complex data structures, relationships and attributes, which will require skill to maintain accurately and correctly. A Data Model editing tool may be used by developers to design, develop and maintain Devices. This Data Model tool may create XML or other data structures that describe the functionalities of a device, data items, security etc. that can be instanced as part of the Device Data Model Instance Objects.

Additionally, this data model can be used as a mechanism for describing the processing and operation of the physical device 120 and the code that runs on it. This may require the Data Model tool to create code data structures that can be used by coders working on the device.

Figure 8:
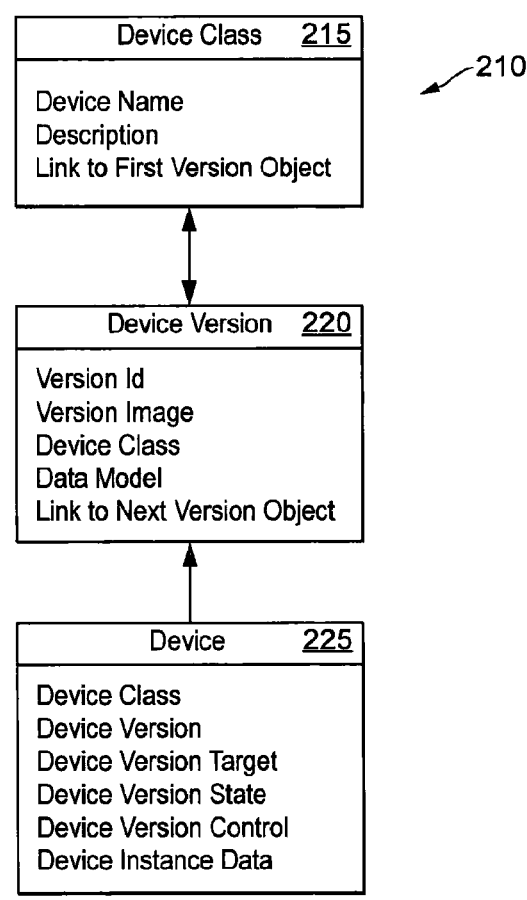
FIG. 8 shows a schematic diagram of an example class object structure used by a processing engine within the device management platform of FIG. 1.

FIG. 8 illustrates schematically an example class object structure 210.

Device Class Instances

Device Class Objects 215 may contain generic information about a device type and its purpose is to act as a collection point for all activities that relate to all devices of that type.

Device Version Instances

Device Version instance Objects 220 may link to a device type and be used to contain information common to all Devices that are at that version level. This object may encapsulate firmware update/apply logic for devices that are being transitioned between firmware version levels or sequences of version levels. Firmware management goes through three phases in this example:
1) Load the firmware onto the device;
2) Do checks and any other preparation on the device prior to making the firmware operational; and
3) Apply the update—ie make it the current running firmware. This version specific data may include:
   1) Version name—this may be an ASCII string (A null terminated ASCII string);
   2) Firmware ref—Reference to a firmware binary image required to bring a device to this firmware version;
   3) Data Model—Reference to a Device Instance data model structure that describes the data objects for Devices of this firmware instance, as well as describing the data items that may be associated to devices of this type/version. This data structure may be used to migrate device instance data between different firmware versions. For example, this may occur if a new firmware release supports an additional data object describing external temperature. The firmware update can result in the firmware software changing AND it will also extend the Device Instance data model to include the new temperature setting, data item etc.; and
   4) Link to Next Device version Object—Used when a device needs to be transitioned to a new Device version level, the referenced Next Device version Object may describe all the data structures required to transition to the next version level. This includes Firmware Image to Apply, all differences (additions, deletions, changes) between the Data Models transitioning between version levels.

An advantage of using this declarative approach to describing firmware images and the data models differences between firmware images include the ability to
1) manage firmware version transitioning that may involve multiple firmware versions;
2) manage device data model changes between firmware versions;
3) offer the capability to reverse the firmware transitioning process, i.e. to roll devices back to previous versions; and
4) offers the capability to support firmware version trees. This allows different firmware versions to be applied depending on requirements.

Device Data Structure Relationships

For a particular device type there may be a single Device Class representing all the devices of that particular type. Alternatively Devices of a similar type but with different versioning requirements may be represented by multiple device class objects. In an example, a device may have significantly different versioning requirements, such as a device designed for Chinese language markets and European markets. The devices could be treated as completely different device types.

The Device Class object 215 has member data items that are descriptive of the device class object. One of these members may be a single link to a Device Version object.

The Device Version object 220 would encapsulate a description of a specific device at that version level. This object may contain:
The Firmware Image required to bring a version of the device up to this version level;

The Device Instance Data Model for the device at this version level (it may be defined and managed as xml data, but internally it will be implemented using java objects, for example); and A link to the next version object (if there is one) in the sequence of versions The Device object 225 may contain:

A reference to the Device's Device Class 215 and Device Version 220.

A reference to the Target version that this Device will need to be transitioned to. Normally this will be the most up to date version for the Device.

A Version state field used to describe status of previous versioning actions.

A Version control field used to control how a device will be transitioned between versions.

Device Instance Data for all data structures defined for Devices of this class and Version level. (As defined in the data model data structure instanced in the Device Version data structure.)

Device Data Structures SDK Activities

The Device Data structures may contain information about devices required to transition firmware between different versions. A Device Data Structure Versioning tool for managing the definition of the different data structures and the relationships between them to facilitate automated transitioning between versions of software.

Getters/Setters/Reflection

All data structures may support getter/setters accessible on the platform and also available via the North Bound Interface 160. All Device instanced data items described in the Device Version Data Model may also support getter/setters.

The only limitation on getter/setters may be those described by the role based security model. The security role model for a device may be defined and encapsulated into the Device Version Data Model. All other Data Structures in the Device Class, Device Version and Device Instance Objects may support an appropriate security model.

Reflection is the ability to query the data type and associated meta information. Reflection may be supported for access to the Device Data Model.

Serialisation

All Data Structures may be serialisable. This is a mechanism used to support replication, back up and master/slave configuration.

This allows multiple DMAP servers to interoperate. All data structures may be serialised and once serialised may be transferred between DMAP servers. This mechanism can be used to architect DMAP servers into:

1) Master/Slave configurations—where master DMAP servers accept NBi requests and serialise communications to Slave DMAP servers;
2) Pooled configuration—where DMAP servers operate at the same level and communicate instance data between themselves; and
3) Forwarder and Proxy configurations.

Backup, standby (hot/warm/cold) can all use the same serialisation mechanism to communicate instance data so that it can be saved and restored when needed.

Alerts, Diagnostics and Logs—Trigger Actions

Alerts, diagnostics and logs may all use the same underlying mechanism, which is to define the conditions which will result in the Alert/Diagnostic/Log event happening. This is referred to as the Trigger Action. Data may be generated as a result of the Trigger Action event happening. The Trigger Action may also define where that data is sent.

The Trigger Mechanism

Trigger Actions may be associated with Device Class or Device Version Instances, meaning that an alert could be specific to multiple physical devices all of the same type. It will also be possible to define a Trigger Action on a device by device basis.

Trigger Actions may be defined at:
1) Device Class level—All devices of that class;
2) Device Version level—All devices of a specific class at a specific version level; and/or
3) Device level—Individual targeted devices.

Trigger Data Structure—Conditions

Triggers may be instanced and named data structures, where each named trigger has a number of conditions associated with it. These conditions can be simple, lvalue operator rvalue triplets where:

The lvalue represents a variable (i.e. a Device Data item instance object) or another condition trigger A relational, logical or arithmetic operator An rvalue, which can be an lvalue or a constant An example condition trigger may be Voltage_sensor GreaterThan 12. Similarly conditions can be chained together using Boolean logic referring to other named triggers i.e. Trigger 1 AND Trigger 2

Trigger Data Structures—Components

Triggers may be named and may be made up from a list of Trigger conditions.

Trigger Action Data Structures

A trigger/action data structure may be used to describe the action or actions to perform in the event of a trigger condition being applied and the result of processing the conditions is true. The trigger action data structure, may be named, and may comprise any one or more of:

A named trigger Data Structure comprising a list of Trigger Conditions

A named Callback

A named Data Model structure describing instance data associated with the Triggering Device Data Instance.

Trigger Processing

The Trigger Action processing may be initiated in a number of ways. The mechanism described in this example is data driven.

A Trigger Action may be defined for a device or a collection of devices

Device Data Instance data may be updated or changed

All Trigger Actions associated with the device may be processed in turn

If a list of Trigger Conditions associated with a Trigger Action results in a TRUE then the associated Data Structure may be populated with data from the Device Data Instance (i.e. all Data Items with the same name and type are copied into the Trigger Data Instance structure). The contents of this Trigger Data Instance structure are communicated over the North Bound Interface 160 as defined by the Trigger Action Callback Mechanisms may be used to ensure that this Trigger Action does not fire repeatedly.

Other initiating mechanisms may be used to process triggers, such as a background process that may iterate through the entire list of Device Instances testing each Device's trigger conditions in turn and repetitively.

South Bound Interface 170

Managed Devices—Logical Model

The Logical connectivity Model of the DM platform (see FIG. 12, Logical View SBi), supports three categories of communication.

1) Wakeups—This is the mechanism used to wake-up an identified device and cause it to establish communications with the DM Server. The M2M platform security model may only allow Device wakeup to be triggered from the DM server using an SMS-MT. This has the advantage that devices can only be triggered to perform operations via the M2M platform environment (with its enforced P2P restriction mechanism). An alternative to this example DM Server triggered wakeup is for Devices to be configured with wakeup triggers, so that Devices automatically trigger wakeups after predefined timeouts or as a consequence of Device data items falling within or outside predefined ranges.
2) Device SMS-MO—Devices may send SMS messages to the DM Server. This mechanism may be used as an alternative to a socket connection where the information being communicated to the DM Server can be represented using a small packet of data.
3) Device to DM Server. This may be a TCP/UDP client/server communications protocol (other protocols may be used) where the Device which functions as the client, may establish a socket connection with a DM Server. Once the connection is established the client can communicate data changes to the DM Server, and the Client may also request Command/Control/Communication instructions from the DM server, which it will then act upon.

Managed Devices—Physical Model

Types of example data communication include SMS and Internet Protocol (Connection or connectionless) connections. The physical connection pathways, will be either over cellular bearers, or cellular and wired/wireless internet connection mechanisms.

Figure 9:
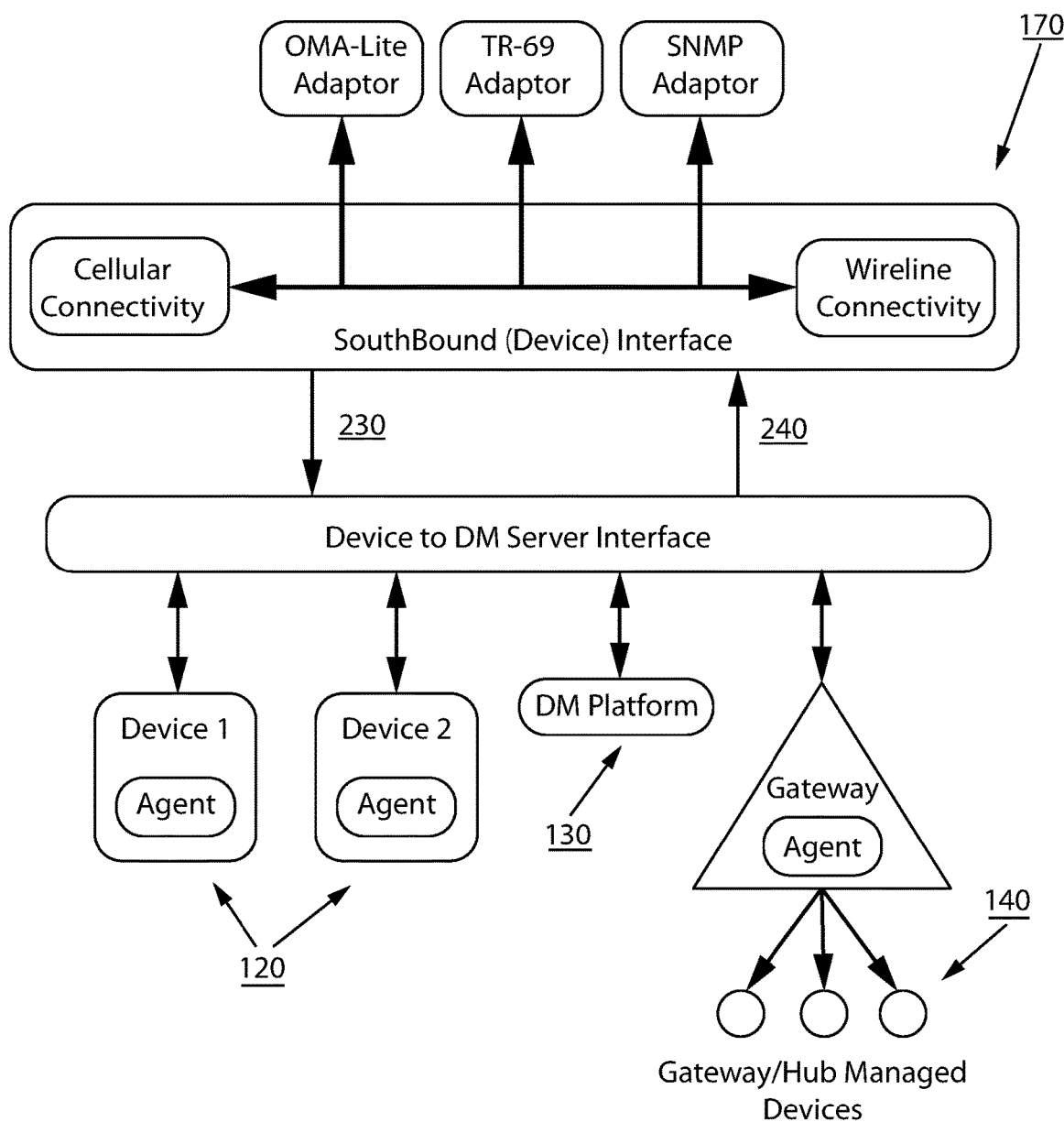
FIG. 9 shows a schematic diagram of a physical arrangement of components forming the device management platform of FIG. 1.

FIG. 9 illustrates schematically an example physical connectivity arrangement. This example includes specific adapters for interfacing with the SBi 170. These adapters together with SMS mobile terminated (SMS-MT) wakeup commands 230 and IP Connectivity 240 over the cellular network may use an APN connection defined on the M2M Device. Once an APN Device Context is created from the device into the DM Server environment, Devices may then be able to establish Client Server connections into the DM Servers.

SMS Wakeup Mechanism

Figure 10:
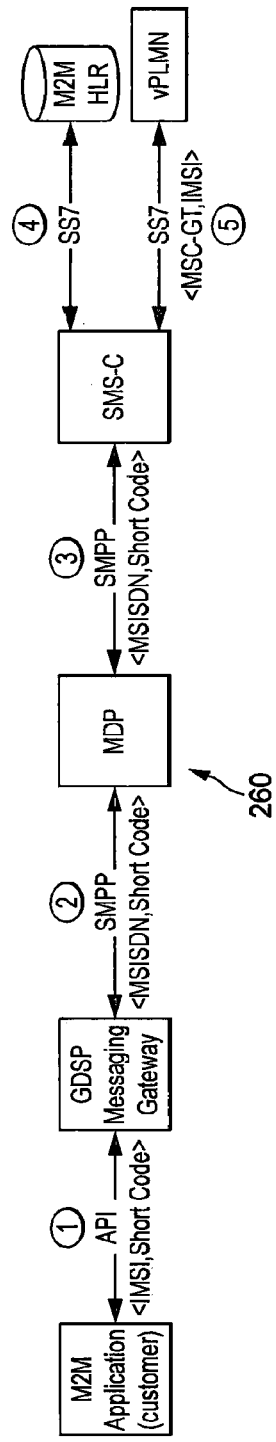
FIG. 10 shows a flow diagram of a process for waking up one or more devices managed by the device management platform of FIG. 1.

FIG. 10 illustrates schematically a process 260 of Wakeup SMS from DM Server to Device. In this example, the only connection pathway for initiating communications to devices (attached to the PLMN network) is via SMS-MT from the M2M platform DM server environment to the Device.

FIG. 10 shows the M2M application (the DM Server) initiating the SMS-MT generation. This may be triggered by a number of conditions or criteria. Some may be initiated by customer actions requested via the North Bound Interface 160, for example. Other conditions that may trigger device wakeup could be started automatically as a result of Device Data Model structures indicating that some device interaction is required (e.g. instance data may require updating because it is out of date). Rules may be applied including that only a global data service platform short message peer-to-peer (GDSP SMPP) client application may be able to send SMS mobile terminated (SMS-MT) to a GDSP SIM. Furthermore, a GDSP SMPP client application may be restricted so that it is unable to send SMS-MT to any other number, for example.

SMS from Device to DM Server

Figure 11:
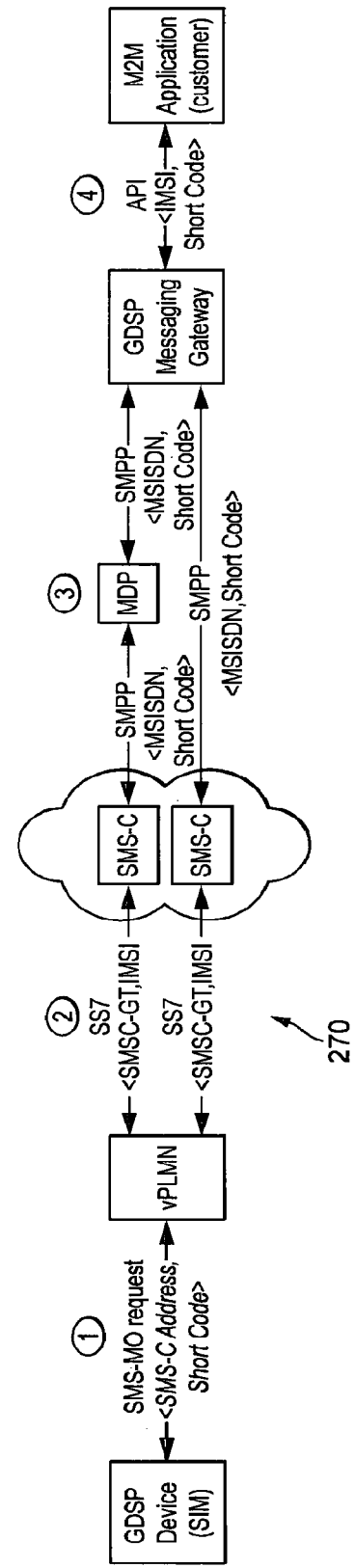
FIG. 11 shows an example flowchart of a process of an SMS being sent from a device to the device management platform of FIG. 1.

Devices using M2M platform SIMs may be restricted so that they are only able to send SMS Mobile Originated messages to the DM Server (in FIG. 11 this is shown as the M2M application). This may be used as an alternative communications path from device to DM Server for situations requiring it.

FIG. 11 shows an example process 270 of an SMS being sent from a Device 120 to the DM Server. This example may include rules that a GDSP SIM is able to send mobile originated SMS (SMS-MO) only to the GDSP SMPP client application defined on by an SMS centre (SMS-C).

The above rule may mean that SMS-MO are initiated by the M2M platform device destined for the M2M application (the DM Server) on the customer server.

Device to DM Server IP Connectivity

Devices may support Device to DM Server IP connectivity 240, using connection and connectionless protocols. When the communication takes place over the cellular network the Device may establish an APN Device context and the communication may take place over this device context to the identified device instance object represented on the DM Server.

Figure 12:
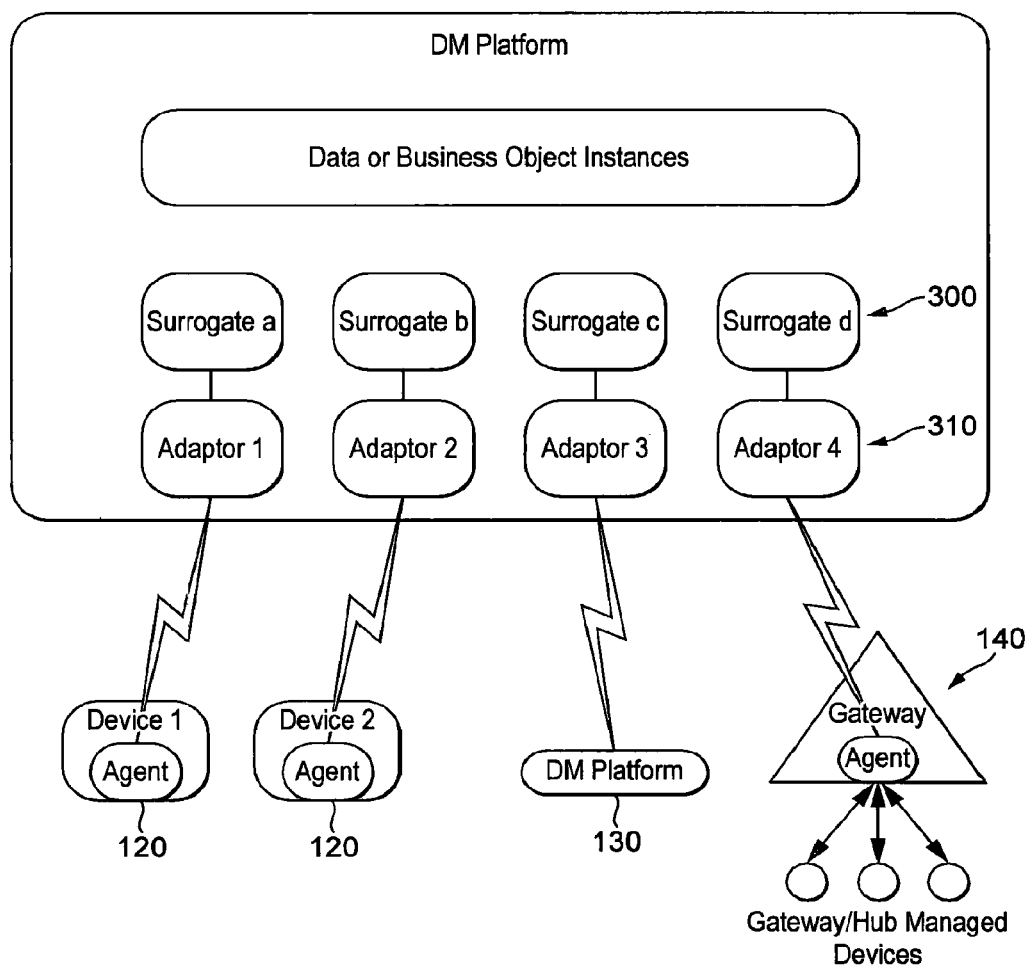
FIG. 12 shows a schematic diagram of a logical view of the southbound interface of FIG. 1.

For wired and wireless IP connections the same client server relationship between Device and Device Server may be used, Managed Device—Device Types In one example implementation there may be three types of logical Device connectivity types:

1) The Adaptor/Device Agent connection, where there is a one-one logical device adaptor connection between the DM Server over the SBi 170 to Devices using an Agent that supports a protocol that is common to both the Adaptor and the Agent. E.g. OMA-Lite, TR-069, SNMP, or another (e.g. proprietary) protocol.
2) The Adaptor/Adaptor connection, where there is a connection to a second DM Server. In this configuration the second DM server manages the Adaptor/Device agent connectivity, and the data items are communicated from the second DM server to the first. This may be thought of as a Master/Slave configuration. Where the topmost DM Server is the Master, the subordinate DM Server is the Slave and communications between the two is facilitated using Data Object serialisation mechanisms.
3) FIG. 12 illustrates a Logical View of the SBi 170. The third type of logical relationship is where the Device is functioning as a Gateway to a number of other DM platforms 130, appliances and devices 120, e.g. a Smart Meter controlling multiple other peripherals over I2C, RS484, RS232, ODB2 or other buses. This last example is an extension of the first device logical connection type, but where the physical connectivity to peripherals is abstracted out by the Devices 120 being managed.

Device Data Abstraction

The Device Data Abstraction mechanisms allows the DM Server to virtualise images of physical Devices, this Data Abstraction mechanism refers to the DM Server's views of devices as Instance Data, where the contents of this instance data is described declaratively using a Device Data Model description language (e.g. XML based). This then allows applications to interact with the physical devices indirectly via the Instance Data.

This declarative and indirect approach to Device Management has a number of benefits. Not least being that it allows the Device Developer/Vendor to describe devices and their functionality by means of a Device Data Model.

This Device Data model approach may be supported and used by a number of different application protocols including OMA-LWM2M, TR-069 and SNMP, for example.

This abstraction mechanism may be extended to support additional attributes not necessarily supported by all underlying communication protocols. For example OMA-DM supports a role based security model, but SNMP and TR-069 do not. By using a Data Model that supports security role attributes it provides compatibility with the application protocols that support it, but it also can be used for devices using application protocols that don't support it.

Figure 13:
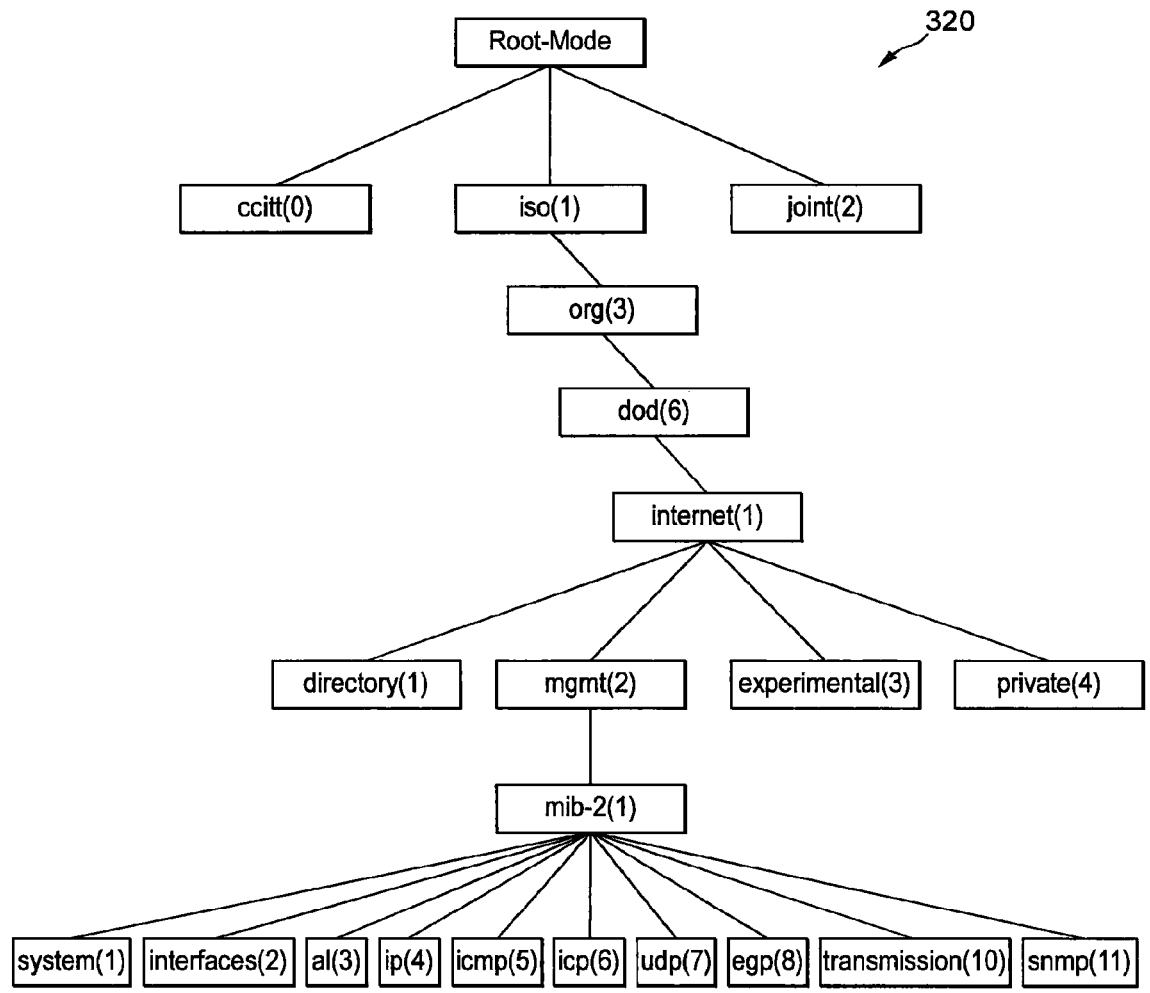
FIG. 13 shows an example management information base data structure used to represent the managed devices.

FIG. 13 shows part of an example management information base (MIB) data structure 320 used to represent SNMP managed devices. This application management protocol may not support role based attributes.

Supporting Additional Attributes

Devices using the SNMP protocol can still use a Data Model that supports security role specification, it just means that the device may not support that role based mechanism. It still has value, as the Device Developer can now describe the Data Model for the device in terms of the MIB specification and can overlay additional meta information as appropriate.

The Data Model and Gateway Devices

As described earlier the Device may be functioning as a hub or gateway device to a number of other peripherals, where these peripherals are connected via a multiplicity of different communication mechanisms. In this case the Data Model may accommodate this extended view of the Gateway/Hub as though these peripheral components were part of the same Data Model. All communications between the Hub/Gateway and the Peripherals may then be abstracted out and transparent to the DM Server and any applications accessing it. Where control/status mechanisms are required or desirable these can similarly be incorporated into the Device Data Model.

The designer/specifier of the Data Model should accurately describe the Device's/Hub's Data Model so that it reflects the functionality.

Device/South Bound Interface Layer (SBi) 170

The Device/South Bound Interface Layer provides the link between the DM Platform and the Devices 120. The Device Interface layer performs several functions in this example:

Service API requests from higher level layers and return results

Figure 14:
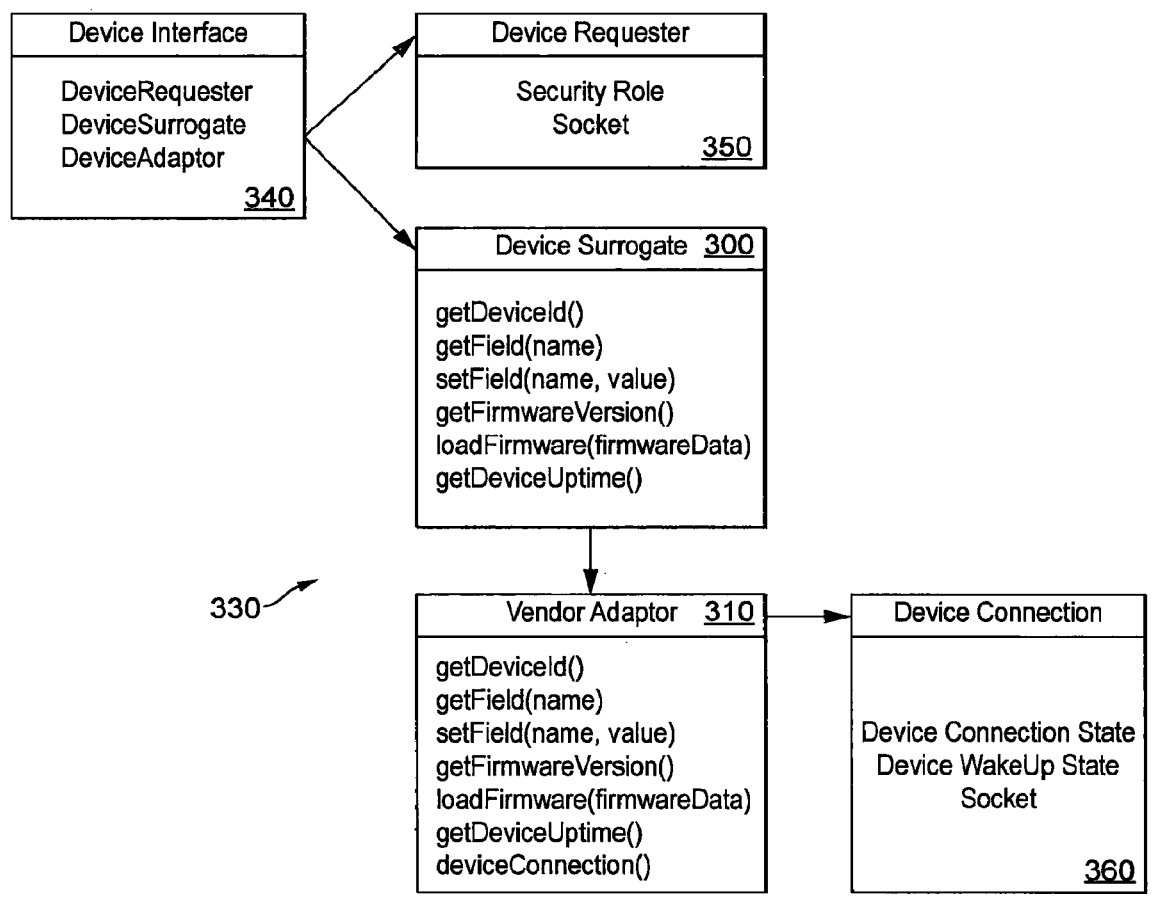
FIG. 14 shows a class diagram of a device interface model.

Ensures that requests are only performed consistent with the security roles of requesters Ensures that multiple requests from multiple sources to physical devices are synchronised correctly Ensures that device connections are managed efficiently Supports a (potentially) wide number of different vendor supplied appliances Supports interfaces via other DM platforms A model for this layer is shown schematically as a device interface model 330 in FIG. 14.

The different components shown in this figure include:

Device Interface 340—This is an instance of a Device object that higher level requesters may use to query and access a Device over the NBi 160 (The NBi 160 provides a mechanism for applications to get/set Device Instance data). The Device Interface 340 may contain separate elements Device Requester object 350—this describes the requesting agent in terms of his security role, and socket communication link.

Device Surrogate 300—contains a standard representation of a device. This representation may be common to all vendor devices.

Vendor Adaptor 310—Each vendor may have a unique subclass adaptor that contains all the device dependent functionality.

Device Connection 360—Contains all data objects describing the SBi connection. Typically, this may be the socket connection object plus any other information such as status of a pending SMS-Wakeup, details of an APN connection, or class of connection (wireline/wireless/cellular).

Figure 15:
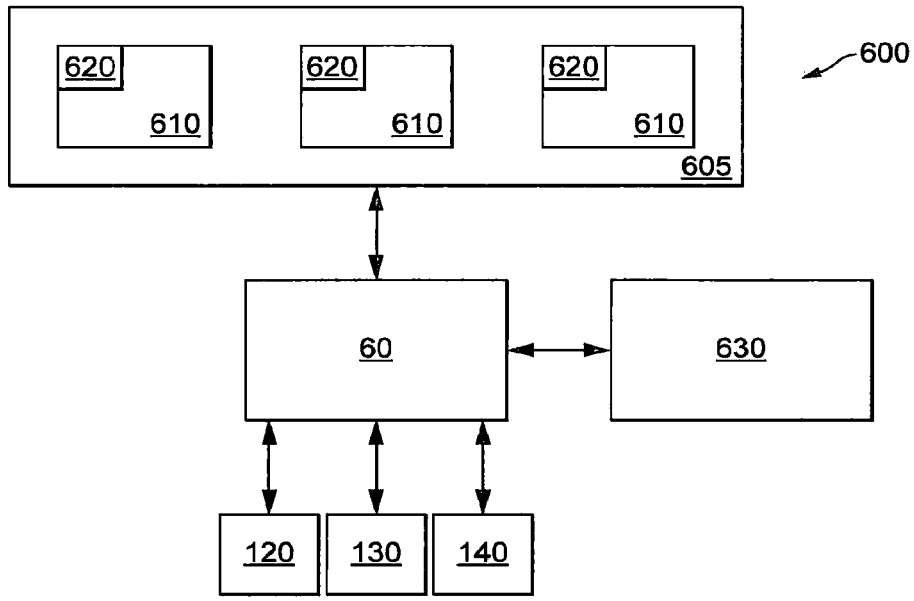
FIG. 15 shows a schematic diagram of an example system for managing devices.

FIG. 15 illustrates schematically a Device Interface Adaptor/Agent Model. This "surrogate" approach to describing physical devices de-couples the vendor specific features of the device from the APIs that may be used to perform operations upon and query the devices. The device specific logic is similarly placed in objects using an Adaptor Design Pattern in this example. Therefore, this may result in a model-view-controller (MVC) solution that is both simple to use and that can be used with different types of vendor appliance. The surrogate object 300 contains a representation of the data held on the physical device.

This Device Data Model would best be described using an XML notation. Instances of Device Objects could use XML notation at run-time or alternatively at compile time. The Data Model may define a set of variables mapping onto the OMA-DM/LWM2M data model. The Data Model may include access control list (ACL) structures, for example.

It may be possible to use property models to enforce an ACL on data structures. However, a simpler approach is to create a higher level object that contains a device surrogate object and representation of the requester raising the query. This requester object may also include the security role of the requester.

Querying a device's version might follow the following example sequence of operations:

An Application needs to query the version of a specific Device.

The Application invokes an API getter for the device class—the getter input parameter specifies unique device id and the field name (this example will be querying a field called Version) and requester object.

Check that the role of the requester object is allowed to access the device's field. If not then throw a security exception.

If instance of device surrogate object 300 exists and version data is timely, return Device version information held in surrogate instance data and exit. (NB There is no requirement to query the actual device).

If instance of device does not exist—create device instance using a Builder Creational Pattern. The Builder can either use predefined device subclass (compile time instance) or using XML to create run-time device instance. The builder may need to instantiate both a surrogate object 30 and an adaptor object 310.

The device instance exists but the virtualised version information is not up to date. So the adaptor object raises a request to an M2M platform to initiate a device SMS wakeup to the physical M2M device with packet data protocol (PDP) context terminating in the DM platform.

Device context between Device and DM platform is created.

The Device identifies the Device it represents using its unique Device id. This information is used to select the Device Instance on the DM Server that represents the physical Device. The connection object is then assigned to the Device connection requestor object. All communication from the Device to the DM Server is now linked directly to the data structures representing the Device Instance.

The physical Device and the DM Server Device Instance can now communicate directly and the Device can transfer values for the device's data structures to the Device Instance. This could be optimised to upload all data or only data that is immediately required.

Return results of version getter function to querying application.

The advantage of this "surrogate object" approach is that:

It is simpler to implement.

It supports multithreaded access to device data—there may always be at most a single instance of a device's data model, but possibly multiple agents querying that data at once. Mutex regions may operate within the getter/setters to ensure correct synchronisation.

It can be used as the mechanism to manage a role based security model.

Data models can be defined using XML or other notation so the same mechanism can be used to interact with all the M2M devices data structures, including configuration parameters, firmware and applications. This simplifies and standardises device management functions.

It is suitable for numerous performance optimisations.

It supports multiple vendor products.

Vendor Interfaces—Device Abstraction

The architectural model may provide interfaces to more than one vendor's devices. Different vendors' products may have different capabilities and in some cases very different functionality. Preferably, all devices may support a standards based communications protocol.

Each vendor appliance type may require its own specific Device Adaptor Class and each physical/virtual device connection may require an instance object of both the surrogate 300 and the adaptor 310 class to represent that connection.

Several types of adapter class may be required. FIG. 15 illustrates and example Device Interface Adapter/Agent Model that may be:

Standards Compliant—i.e. a single Adaptor Class could be used for all vendor devices that support the OMA-DM standard.

Non Standard—i.e. Adaptors that connect to vendor devices in non-standard ways.

DM to Gateway/Hub.

DM to DM—Not all adaptors may connect to endpoint devices. There may be a requirement to communicate with vendor devices via other DM Platforms (e.g. iDigi, Redbend).

Abstracting DM Platform to Device connectivity using a Surrogate-Adaptor model means that higher level applications may all access devices using the same APIs.

Architectural Variations

The DM Server may be used to represent many different physical devices as virtualised Device Instances. This Device Instance data is volatile and may have been created over an extended period of time. Device Instances that have not been updated because the physical devices they represent are not available (e.g. because they have been turned off) may be very old.

If the DM Server is restarted there is the potential for all this cached Device Instance data to be lost. The remedy in this situation will be to re-acquire the virtualised Device data, from the physical devices—AGAIN. The data may be stored permanently in the M2M platform, e.g. in some database. As the device instance data is all serialisable it can be stored anywhere—including on other DMAP servers.

Alternatively the Device Instance data may be re-acquired in other ways.

Device Instance Data Recovery Mechanisms

There are several example approaches that may be used for recovering and distributing Device Instance data in order to improve system availability:

Simple Backup/Restore—The DM Server supports a mechanism to backup all data structures to secondary storage. All Device Instance data may be serialised and this serialised data may be saved to disk. Once saved, the serialised objects can be recreated on the same DM Server platform following a restart. Alternatively, the serialised data may be used to establish a Recovery Point and used to recreate the Device Instances on an alternative backup DM server platform. This restore process to the archived Recovery Point may run in Cold, Warm or Hot standby mode.

Replication—The DM server's serialised Device Instance data structures may be transferred to a replicating DM Server platform. This replicating Secondary DM Server may be accessed in exactly the same way as the Primary DM Server platform, via its North Bound Interface 160, but it will have no South Bound Interface. (However, it will support the SMS Wakeup mechanism).

Master/Slave—This is similar to the Replicating Server configuration. The difference is that in this configuration the Slave DM Server may support the South Bound Interface 170 and all Device Instance data may be communicated with the Master DM Server platform using an adaptor/agent DM—DM communication link where serialised instance data is communicated from the Slave to the Master Server.

Hybrid—The DM Servers may be configured to support the different architectural configurations described above for different devices. The server software may be running in the Cloud to make use of elastic computing. If load increases then the DM Server software performance is increased by powering up such software on additional physical servers. Equally, when not needed, those additional servers won't be used. The data on those servers shall not be lost. Therefore, permanent data storage may be required.

Updating Software

Maintaining, managing and supporting multiple versions of Software for Devices may be achieved by the present system. Furthermore, the DMAP 60 has been designed to simplify and reduce the cost of this activity.

Mechanisms that may be used to support Firmware management are described.

Other types of Software may use similar mechanisms. Such updates may include but are not limited to:

Operating System, full refresh or partial updates

Other Types of Firmware, e.g. Flash based FPGA/Hardware images, as used on certain routers Application Software Firmware updates are one category of software assets that require version management. This has additional complexity particularly when many different devices of many different versions are involved. Further management complexity may arise for application software that has been installed by users.

The mechanisms described below are designed for managing firmware; however these example mechanisms and principals may be extended to support other types of software asset as required.

Device application software version and firmware version management is supported.

Firmware Update Scheduler/Scheduling

Firmware updates may be managed during specific windows of time. Specifically, firmware windows may be defined and associated to Device real estate. For example, this may be on a country by country basis, or all devices may be updated relative to a specific time zone.

Software or firmware changing to a new version may involve a two stage process:
1) Transfer the new software to the platform; and
2) Restart the system so now it uses the new software.

The restart can be triggered in several example ways:
1) Automatically—but this might impact users of the system. If the system is being used for a critical task then this may cause problems.
2) Under user control or following user acknowledgement—this requires a human user to make the decision.
3) When most opportune. The software image may take effect the next time the appliance is restarted.

Software rollbacks to previous releases may be implemented when managing O/S updates. This requirement is met for all software management activities.

To support this requirement additional reference structures in the Device Version object (see 225 in FIG. 8) may be included in order to support backward linking. Device Objects may also include a reference to a rollback target version.

Firmware Update Example

The Device Vendor, application or user may create a new and improved version of firmware for a device. The vendor will test this firmware until he is confident it is sufficiently robust to deploy in the live environment. The stages to deploying a version of firmware may then include (note the following description is illustrative only) a sequence of steps to represent an update and all associated activities using a declarative approach. The Update may be defined together with all dependencies and actions in an update data object. The update data object may then be linked into a network data structure that describes the relationship between this update and previous updates. Once the update is fully defined as well as its relationship with other updates, then the DM platform may process these data structures to automatically transition physical devices through sequences of update operations.

These activities may be sub-divided into:
Create a Device Version object for this release of firmware. This is the update object that describes a specific software update together with all of its dependencies.
  The Device Version Object may have member elements that describe:
    The Firmware Image, which will be the binary image of the firmware code
    The Data model of Devices at that version level
    The Device Class for Devices of this Device Version
Create a link from a previous Device Version object to this Device Version object. This link describes the relationship of this update to other previous updates, e.g. to Update a Device from Version a, to Version c. The update sequence will be Version a, to version b then finally version c. Alternatively, there may be an update pathway from Version a directly to Version c. In any case, this link describes the update transitions between previous updates in order to update an appliance to the latest version.
Modify an existing Device Instance (at this stage in testing this Device Instance may be a test appliance) and configure the instance data item Device Version Target, so that it references the new Device Version representing this new firmware update.
Modify the Device Instance Version Control settings to indicate that it should transition this device from its Current Device Version to its new Device Version. This and the previous step may inform the system that it needs to update this test device.
Trigger the Firmware Scheduler to start running.

The Firmware Scheduler process may iterate through all device instances invoking firmware transitions as required. The Device Objects 225 may contain data objects referencing the current Version and the target version objects for the Device Class and the firmware images for these. Once a Device Instance has been identified as a candidate for a Device Version transition, a series of activities may take place.
  The Device Data Model for the Device at the current version is captured. All Data Items described in the data model may be read from the device so that their values are current. The currency requirements and other meta information that may apply may be defined on a data item by data item basis.
  A new Device Data Model is created using the Data Model defined for the target version of the software. This may be exactly the same as the previous version or there may be multiple differences between the old and the new. In any case, the new Device Data Model may contain sufficient detail to be able to clone the old data model and apply all/any necessary modifications required to bring it up to the new Device Version Target Data Model.
  The new target firmware image is transferred to the Device
  The Device loads the firmware image and resets
  All/any data structure changes required are transferred to the Device
  The Device Data structures are updated to indicate firmware has been transitioned to the new version.

The prioritisation and scheduling of this process can be refined as appropriate. Extending the functionality to manage firmware management campaigns in more sophisticated ways may be implemented.

Firmware Update—SDK Activities

Further features and benefits of this system may include:
1. Virtualising the physical devices provides an improved approach.
2. Working with device data models is also an improvement.
3. Any "off the shelf" application management software may need to be implemented in terms of the NBi bus and its capabilities and would require Device Vendors to support a standardised or generic data model. Version management tools may be implemented.
4. NBi, authentication and checking third party user identities etc. may re-use existing AAA or identity management mechanisms. When using a proxy server, a third party (user or application) may obtain access to the proxy via the NBi. A similar mechanism may be used in an M2M platform, where external users also get access to an operator platform. Re-use of common system components therefore avoids stove-pipe solutions and the building-from-scratch of various system components such as those supporting login and authentication.
5. For external users or customers there may be a single sign on (SSO) capability such that they can sign into the service of the DM proxy once they have signed into the use of an M2M platform.
6. The architecture and design of the DM proxy system itself may be modular.
7. "Cloudification" of the processing engine may provide additional benefits. For example, this may be advantageous if the number of devices (e.g. TR-069 devices) rises dramatically. The TR-069 or other adapter may then require higher performance and so it should be easier to scale this up and this is possible using the elastic computing of a Cloud. A further preferable feature may be that the TR-069 adapter process can be multiplied onto additional servers in the Cloud with these adapters being able to communicate with the rest of the DMAP in the usual way.

Similarly, if it turns out that lots of customers like to set alerts for M2M assets and the trigger processing requires greater performance then this may be accommodated with the press of a button (or in an automated manner) using elastic cloud computing. Again, the trigger processing component then needs to be identifiable as the one that needs to be allocate higher overall performance.

Elastic computing and the internal components of the DMAP processing engine may have well-defined interfaces that are suitable for Cloud-internal communication.
This is supported using the serialisation mechanism.
8. As mentioned above, to "see the whole DMAP in action" high level message flow diagrams (using some off-the-shelf tools) may be provided. This may show the interaction between customer→NBi→DMAP processing engine→SBi (surrogate→adaptor→TR-069/LWM2M)→device management client structure into different swim lanes, for example.
9. The design may be flexible, e.g.:
   a. Design for Cloud-deployment-readiness
   b. Design for scalability and performance
   c. Design for extensibility with regards to DMAP feature scope (including the proxy taking some role in an architecture for data analytics, or brokerage of business objects).
   d. Design for extensibility of data models: to cope with future, yet unknown M2M assets and devices emerging.
   e. Design for security.
   f. Design for reliability and resilience (this may come automatically through a deployment on top of an IaaS via an appropriate SLA).

Additional example features may include encrypted searches, where the search terms (and/or the results) are encrypted. This may be extended to encrypted diagnostics/logs/alerts/machine learning. Encrypted data may be examined on a neutral third party platform and an action decision may be made based on the encrypted input data. An example may be where an analytics company performed analysis on encrypted input data and inferring results without any knowledge of the plain text of the inputs or outputs.

Homomorphic encryption may also be used, as this allows arbitrary computations to be performed on encrypted data (e.g. by untrusted parties) without breaking the encryption.

A mechanism may be provided that allows the operator to define tests that will exercise the equipment and verify correct operation. For example, a memory checksum test may collect Memory Signatures generated using predefined polynomial CRC checks across portions of memory. The memory checksum function is beneficial as it can be used to confirm the version of software and it can be used to confirm correct behaviour of memory read operations on the equipment.

The system provides a way of mapping a collection of data values onto a single list structure such that all of the information specific to a particular task is collected together and can be accessed in a single query.

In the context of the two requirements described above, a list data structure with all the version specific data may be created that contains all features and values that can uniquely identify an appliance and which could include a memory checksum (to verify that a specific version of software was installed). A second list data structure may be created that contains all the features and values relevant to identifying correct operation and diagnosing possible causes of incorrect operation.

Describing these role based list data structures includes the benefits of:
1) Simplifying the application developer's task;
2) Simplifying the management and application of security controls; and
3) Reducing the network resources required to access data on an appliance.

Devices such as M2M capable appliances provide standardised diagnostic, monitoring and management functions so that they can be managed in a commercially effective manner.

Attributes of the system may include:
1) Enhanced verification mechanism to verify that devices and M2M appliances in particular are suitable candidates for software updates. The current approach is to program into the software/hardware version information and allow for this information to be queried. The current approach lacks rigor but by making the version verification process more rigorous it will reduce the likelihood of potentially costly errors occurring.
2) Enhanced diagnostic process to provide sufficient data to enable sophisticated error detection and prediction in a device independent fashion. The current approach requires the operator to have some knowledge of the appliance, how it works and symptoms to look for when diagnosing faults. This typically manual process relies on knowledgeable operators with experience that is improved over time. The proposed enhancements would allow the operator to perform diagnostics in a device independent fashion, requiring minimal knowledge or understanding of how the device works and where much of the diagnostic activity can be automated using Artificial Intelligence techniques, for example.
3) Enhanced data query process to facilitate the use of sophisticated machine learning techniques on the management platform by the platform operator, with the purpose of identifying actions to take in a timely fashion. Fault diagnosis is one application but there are potentially many other applications for this benefit.
4) Enhanced alerting processes to provide sophisticated appliance side alerting in a device independent fashion.
5) Management of all enhancements above to simplify the way these processes are used, such that information flow follows a role based security model with assured levels of integrity and confidentiality.

6) All enhancements above may be provided such that the operator of the DM platform requires no visibility or understanding of the appliances being managed.

Technical Approach

To define a standard mechanism for collecting data values from devices (e.g. M2M appliances), such that a single query can be used to gain access to multiple values. These collections of values may be referred to as feature lists, as described above.

To define a standard mechanism for specifying data values and data signature values that will be mapped into feature lists To define a standard mechanism for querying meta information describing the elements of feature lists e.g. type, access rights, ranges of values etc.

To define a standard mechanism for describing access rights at a feature list level and authentication requirements required to gain access to them, in such a way as to protect the integrity and confidentiality of the information represented by the contents of the feature lists.

To define a standard mechanism for describing linkages between features in different feature lists, such that the information contained in different feature lists can be combined for analysis purposes.

To define a standard mechanism for specifying signature data values for devices and M2M appliances, such that information about the health of an appliance and the assets it represents can be confirmed, Collectively these extensions may allow the use of sophisticated analytics.

According to one aspect, there is provided a mechanism that allows a developer of M2M devices to map data values in such a way as to be appropriate for the way that that data will be used. The mechanism may allow a device or M2M platform operator to provide an automated system for predicting faults in appliances that are being monitored by the device or M2M platform operator, without requiring that operator to have any knowledge or understanding of appliances being monitored.

This may allow the provision of a fault diagnostic and prediction service to third parties deploying M2M equipped devices in end customer premises. As an extension to this system, it could be integrated with Business Logic to allow additional alerting and prediction capabilities in an application specific way.

One purpose of the device or system is to provide a generic mechanism for mapping unorganised and hierarchically organised data structures into relationally organised list structures that are appropriate for application use.

An application of this device would be to predict future behaviour of an appliance and events that it is monitoring based on past activities. The purpose might be to monitor appliances for correct operation in an automated fashion or it might be used to predict an imminent application specific event such as an increase in power requirements for a household, for example.

The mechanism will allow an operator to capture and record behaviour of an appliance over a period of time, such that future results from an appliance can be predicted in a fashion that places no reliance on the operator having any knowledge of the appliance or its operation. The results being predicted might concern the correct operation of the appliance being monitored or it could be some other prediction that has some value (e.g. predicting/identifying a medical emergency).

EXAMPLES i) Clause 1

A device that maps data values into linear list structures such that the contents of the list structures can be collected and analysed without the operator of the collection process or the analysis process requiring any knowledge of what the data represents.

NOTE These data values are subsequently referred to as features in the following examples. Collections of features are referred to as feature lists.

ii) Clause 2

A multiplicity of feature types appropriate for representing different types of information iii) Clause 3

Feature Lists and Features will have associated meta data, sufficient to describe the features in a way that will facilitate processing of feature data by third parties, without the third parties requiring application level knowledge. Illustrative meta data would include, type of feature data, ranges of possible values, descriptive information etc.

iv) Clause 4

A mechanism for describing feature data in such a way as to minimise the memory storage requirement for describing that feature data. In the case of Checksums, it is only necessary to record whether a checksum is correct or incorrect and this feature data item can be described as a single bit. The advantage this confers is to reduce the amount of storage required to record and communicate captured feature data.

v) Clause 5

A mechanism for describing sets of feature data items into feature lists, comprising single compressed sequences of values. The advantage this confers is to minimise the number of communication transactions required in order for an M2M feature data collection mechanism to collect a set of related features from an appliance instead of making multiple requests to query multiple sensors, CRC checksums etc. The feature list collection process will make a single Get Feature Data communication request, and all feature data for the requested feature list type will be collected in a single transaction.

vi) Clause 6

A mechanism for describing multiple feature lists, such that a collection mechanism could request a specific feature list to collect which would be a sub-set of the full set of features and only contain feature data items relevant for the purpose it is being collected.

This would allow different feature list collection agencies to collect feature lists appropriate to their requirements. For example, a medical appliance might contain patient sensitive information such as location and personal identity, which would be valuable for medical diagnostic and epidemiological purposes but of no interest to the equipment vendor. In such an instance one feature list would be collected for use and analysis by the hardware vendor to confirm correct operation of the appliance and a second feature list would be collected by the medical practitioners for the purpose of medically focused analysis.

vii) Clause 7

A mechanism for assigning different access rights on different Feature lists such that different actors have different access rights to different lists, with appropriate levels of confidentiality and integrity applied.

viii) Clause 8

A mechanism for querying, modifying and deleting features. Using feature lists to describe the feature values of interest, such that different actors have different access rights to different lists, with appropriate levels of confidentiality and integrity applied.

ix) Clause 9

A mechanism for identifying faulty circuits and associating the failures and types of failure with feature information that had been previously collected as per Clause 3. This is referred to as Result Data in subsequent clauses.

x) Clause 10

A mechanism for identifying result data other than circuit fault, as outlined in Clause 9, such as an indicator that a medical emergency is imminent and that a patient being monitored requires urgent attention xi) Clause 11

As per clause 10, but for other outcomes, such as an indicator that a House hold is not making efficient use of Electrical Power Supply and that an energy audit would be recommended xii) Clause 12

A process that allows for an electronic appliance to be described using multiple signatures. These signatures may be generated in a variety of ways. Signatures will be generated in a mathematically appropriate fashion designed to best describe an object in a unique way. One mechanism would generate signatures using Cyclic Redundancy Codes (CRC) in combination with a predefined polynomial.

xiii) Clause 13

The device would use a multiplicity of feature types, to describe multiple features of an electronic circuit. These feature types may include:
1) A Checksum generated for the values held in a region of computer memory
2) A Checksum generated from a sequence digital outputs of a circuit following the introduction of a predefined sequence of inputs
3) Specific values held in memory
4) Specific values generated by electric circuits, e.g. a temperature reading
5) Specific values as per 4) that have been processed in order to provide additional value, eg an average or a max-min function xiv) Clause 14

An analysis phase that would correlate feature lists with result data, with the purpose of identifying feature value changes that would predict specific result outcomes, such as that an item of equipment will fail in 4 hours, or that an diabetic patient is at risk of hypoglycemic coma.

This analysis phase would use mathematical processes (linear regression analysis and logistical regression analysis) in conjunction with machine learning techniques (neural networks) to identify which features were important in predicting and identifying results, such as the possible imminent failure of an M2M capable appliance or a medical emergency.

NOTE It is important to understand that the system places no reliance on knowing what the features are during the analysis phase and this analysis activity can be completely or partially automated.

xv) Clause 15

A mechanism for describing actions to take in the event of an appliance exhibiting symptoms of failure as predicted during the analysis phase (as per Clause 14). Such as emailing a support person, or raising a trouble ticket.

xvi) Clause 16

In the event of an automated remedial action, (ie upgrade software version, or disable/enable specific feature of equipment) the system would initiate that remedial action.

xvii) Clause 17

A mechanism for describing linkages between multiple feature lists such that the features in one feature list can be correlated with features in another feature list.

xviii) Clause 18

A mechanism for describing location information for a feature list such that the encoding of the location information permits correlation between feature lists but does not disclose real physical location.

xix) Clause 19

A mechanism for describing location information that describes a location in three or four dimensions, relative to predefined secret reference points. This would facilitate the analysis of data by location, in a fashion that anonymised the actual geographical location analysed.

xx) Clause 20

A mechanism that allows an external device to communicate with a device implementing this invention, such as to enable it to change the feature item values in a feature. Such a feature list may be called a Writable Feature List.

xxi) Clause 21

A mechanism that causes feature values in a feature list to selectively initiate actions to be performed. Such a feature list may be called an Action Feature List. An example of an Action Feature List might contain three feature value items, consisting of:
1) Start Time
2) End Time
3) Action to turn off an electrical sensor Further details of the overall architecture are now described and may include:
- a first interface (e.g. North Bound interface—NBi) between a user (e.g. verticals) and a Device Management—DM—platform (e.g. DMAP), said interface to allow management one or more devices (e.g., M2M devices or HUBs managing M2M devices and other DM platforms);
- a second interface (e.g. South Bound interface—SBi) between the DM platform and (i) a second DM platform or (ii) the one or more devices, wherein the second interface may be secure.

In other words, the first interface allows communication between a user and a managed device (e.g. a physical M2M asset) via the DM platform.

The architecture may further comprise the DM platform. The DM platform may comprise a DM server.

The DM server comprises, but is not limited to the following functionalities:
- management (direct or indirect) of the one or more devices, including, for example, collection of devices, registration/deregistration of devices;
- communication (direct or indirect) with: (a) the user (over the first interface) and/or (b.1) the one or more devices; or (b.2) the second DM platform;
- discovery of further devices;
- monitoring of devices, triggering of communications with the user for managing the device (e.g. in response to observing one or more conditions set to be monitored), updating software/firmware at the one or more devices.

The DM server also includes mechanisms and structures to allow the various functionalities to work properly. The DM server can be implemented as a hardware platform, a software platform and/or a cloud service (e.g. cloud-hosted, software as a service, etc.).

The second interface comprises but it is not limited to the following functionalities:

Manage security of communication and check authorisation of communicating entities;
Handle multiple requests;
Manage devices efficiently.
Data Model and Surrogate
Abstracted Model Structure An abstracted hierarchical model structure is defined and/or generated so that it can be used to address any device and/or functionalities to be managed through a Device Management platform. The hierarchical model structure can then be used to derive a specific model to be used at a particular level (e.g. Vertical Applications level, DMAP level, protocol level, device level). In other words, the same structure could be used for representing information associated with the management of a device (e.g. M2M device) and then be "converted" so that it can be appropriately used for the right level, each level having specific requirements.

Communication Model Using Surrogate

The general concept is that, by using a "surrogate" of the receiving entity of a DM communication (e.g. an M2M device, another DM platform, a Hub controlling one or more devices), the communication on the two interfaces can be split and simplified in a significant manner.

In particular, a "surrogate" is a replica of the receiving entity within the framework of the DM platform, i.e. it conforms to a unified data structure (e.g. the abstracted model structure) and/or to a unified protocol defined for a first interface (e.g. the NBi). The "surrogate" is associated with an instance of the receiving entity.

In this way, the communication between the user and the DM platform over the first interface (e.g. NBi) can be performed using a similar message conforming only to the unified data structure, independently of what data structure the actual receiving entity uses. The user effectively communicates with the "surrogate" rather than with the actual receiving entity.

Similarly, the "surrogate" in the DM platform will communicate to its corresponding receiving entity over the second interface by "adapting" the unified data structure into the specific data structure used by the corresponding receiving entity. This is done by way of an adapter.

Additional Mechanisms
Offline Monitoring of Devices

A mechanism for allowing the DM platform to monitor the device "on behalf" of the user (e.g. Vertical Application 20) based on an indication provided by the user, and then provide information back to the user when the DM platform identifies that certain criteria provided in the indication are satisfied.

The mechanism may include the DM platform receiving an indication from the user or application specifying at least one criterion to be monitored for one or more devices. The indication may include a specified manner to contact the user once the at least one criterion has been satisfied. The indication may be provided by way of an asynchronous connection (e.g. a connection that is essentially set to provide the indication but not to receive the response triggered by the at least one criterion). The DM platform monitors the one or more devices 120 based on the at least one criterion. The DM platform contacts the user or application in response to the at least one criterion being satisfied. The indication may be a trigger.

Firmware Update

The ability to upgrade the software on a device (so it is up to date) is a highly valuable and important feature of Device Management—but it is difficult to manage if you have many thousands of devices, all at different versions.

The DM platform uses a declarative approach to managing software/firmware management for collections of devices, that supports different device types, different sequences of actions to perform during updates and most importantly a state machine describing the sequence in which update operations should take place (i.e. where you need to transition the device through multiple updates in order to bring devices up to the latest release level).

Wake-Up Message—Delivery of Secure Data

This is a mechanism to deliver secure parameters directly via the wake-up message (i.e. the message used to wake-up a "dormant" device). The message can be an SMS message, for example. This message is sent by the DM platform in order to trigger a connection (e.g. UDP connection) between the device and the DM platform.

In particular, when using an SMS message, if no existing SMS key is present (i.e. the SMS channel has not been secured), then the message may contain a generic bootstrap architecture (GBA) Push-type of info (because there is no need to secure SMS). On the other hand, if an existing key for SMS is present (i.e. the SMS channel has been secured), then the message can contain any type of security information, for instance further keys that will be used to secure the subsequent connection.

The mechanism may include also a mechanism to determine whether the SMS channel has been secured. One of the advantages of this mechanism is that the signalling between the DM platform and the device may be reduced. It is important to understand that on the present platforms, wakeup from DM platform to device may only be used to wake-up the device. All data communications is always initiated from the device.

Figure 17:
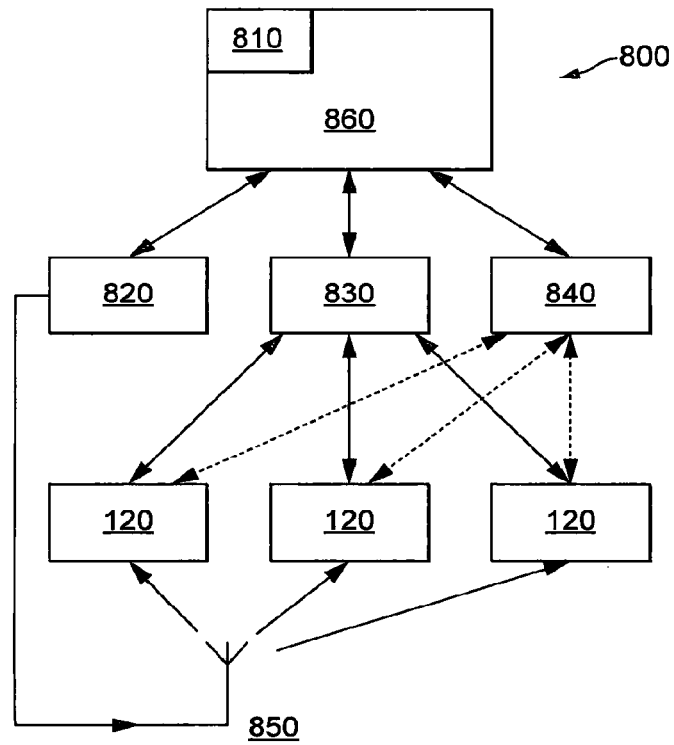
FIG. 17 shows a schematic diagram of a system for communicating with one more managed devices.

FIG. 17 illustrates a schematic diagram of a system 800 used to provide communications between a device manager 860 and one or more managed devices 120.

The device manager 860 contains logic 810 that is used to control the system (e.g. carry out actions on managed devices) and interface with a plurality of communications interfaces 820, 830 and 840. In this example implementation, communications interface 820 is an SMS interface that is arranged to send SMS messages to the managed devices 120 through a cellular network 850. Communications interfaces 830 and 840 are separate interfaces and of different types (e.g. any of transmission control protocol (TCP), user datagram protocol (UDP), cellular, wireless, WiFi, WiMax, wired, fixed line or telephone line) and may communicate wirelessly or using a wired or fixed line link to receive data from and send data to the managed devices 120. This example shows two communications interfaces for sending data to and receiving data from the managed devices 120. However, any number (e.g. one, two, three, four, etc.) may be used on their own or together in any combination.

Communications interface 840 is an optional or alternative communications interface in this example and may be used in place of or to replace communications interface 830. The SMS interface 820 (or another type) may be used to send a message from the device manager 860 to any one or more of the managed devices (e.g. M2M devices or other device managers) to initiate, start-up, wake-up, or otherwise resume communications. This initialisation of communications may be using either or both communications interfaces 830 or 840. When communications interface 840 is not present or not in use the message causes the managed devices 120 to initiate or resume communications over communications interface 830 only.

Wake-Up Message—Trigger Fixed Line Connection

This mechanism may use the wake-up message (or an alternative message) to prompt switching of the connection from the wireless connection over which the message is delivered to either an alternative type of wireless connection (e.g. a connection with a bigger bandwidth) or to a wired connection. The switching may also be from one wired connection to a different wired connection or to a wireless connection, for example. The switching may be determined, for example, based on detection of a large file to be delivered (e.g. which would take too much bandwidth and/or time). The message may prompt the device to automatically switch, or prompt a user associated with that device to switch connection.

This mechanism could, for example, save energy in M2M devices and time to download file (connection time).

In the example system 800 shown in FIG. 17, rather than or as well as causing an initiation of communications from the managed devices 120, the SMS message sent using the SMS interface 820 to the managed devices may cause or trigger a switch from using one communications system or interface 830 (either the interface or system used to send the SMS message or a different one) to another communications system or interface 840.

Figure 18:
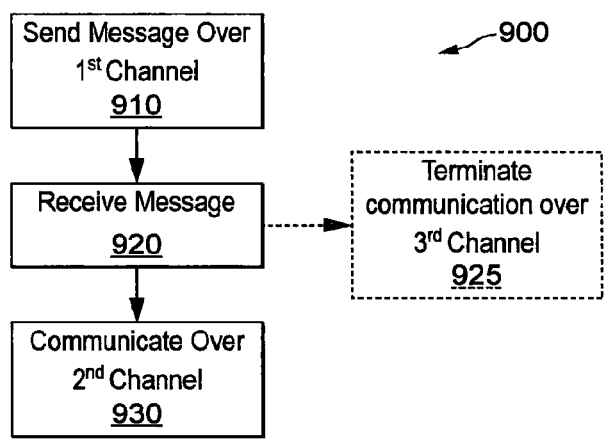
FIG. 18 shows a flowchart of a method for communicating with managed devices.

FIG. 18 shows a flowchart of a method 900 for initiating communications or altering communications between the device manager 860 (or DMAP 60) and one or more of the managed devices 120 shown in FIG. 17. The method may be operated by the logic 810 executed by a processor (not shown in this figure).

At step 910, a message is sent over a first communications channel using communications interface 820 (e.g. SMS). The one or more managed devices 120 receive this message at step 920. This causes step 930, which is an initiation of communications between the managed devices and the device manager 860 over the second communications channel using interface 830. Receipt of the message over communications interface 820 may optionally cause a termination of communications over a third channel (using interface 840) at step 925. This may also be described as a switch of the communications channel from using interface 830 to interface 840 (i.e. from one channel to another).

Further Enhancements:

SBi—in particular, how to handle multiple requests from multiple parties.

Scheduling of software/firmware updates.

The DM Platform uses a Declarative approach and using data structures and their relationships to describe how things work.

A "declarative approach" is a programming term used to describe a data-driven way of representing solutions to problems. The simplest example is traffic lights. To describe declaratively you would describe the traffic lights states (declare them) as being:

{Red, amber, green, amber}

The traffic light processor would then say loop through the four states forever.

Which is clear and simple.

The procedural approach to programming would describe the processing as being:

If red then next state amber

Else if green next state amber

Else if amber and previous state red then next state green

Else next state red.

Which is more difficult to maintain.

The improved system formalises a mechanism for representing and capturing information and data from appliances especially in M2M applications and simplifies the way the captured data are used and managed. As such it has applications in many areas involving data acquisition from remote appliances.

The system may also facilitate improved diagnostic and functional capabilities, especially when working with other M2M appliances and applications. M2M involves capturing lots of data from a wide range of devices and appliances. The challenge and the opportunity is how you analyse and use this data. The improvement provides a method for organising data acquired on/from M2M devices that will make it easier to use and make sense of that data.

1) The SNMP protocol supports data structures that are hierarchies of objects, and that facilitate external processes to query these data structures. The data is queried either item by item, or collections of data within a sub-tree of the hierarchy of the data objects can be queried in a single request. This is a mature technology that is widely supported.

2) OMA-DM and the nascent LWM2M protocols support the representation of data structures in a way that is hierarchical and very similar to SNMP but optimised for M2M environments.

A deficiency of these hierarchical data models is that they are restrictive and simplistic. They do not reflect the way that the data is required to be used. As a consequence the application developer needs to understand where and how the data is organised and usually needs to make multiple requests for data in order to capture all the data items of interest. Acquiring the data (using multiple queries) is expensive, designing applications that use the data requires domain knowledge which is costly and limits how that data can be used by applications.

The improvement describes a way of organising and representing data values into list structures where data items are organised into contiguous sequences of values. The data items that are of (potential) interest on an M2M device to application developers are mapped onto list structures. Examples of illustrative lists:

1) Hardware Diagnostics list, sequence of data values representing hardware checks on the appliance (CRC memory checks, electric circuit behaviour, temperature sensor, water ingress sensors etc.)

2) Equipment version List, sequence of version values of all the identifiable components and software elements.

3) Sensor list, list of sensor values, as unprocessed/processed values. An example of a processed value would be where a temperature sensor value was averaged over a five minute period, or a radio signal-strength was averaged over a three month period.

4) Private Personal list, Location information, personal details of end customer that is subject to data protection law.

5) Time series lists, where multiple lists may be organised into a sequence, such that lists can be accessed and managed in a sequential or random access fashion.

Using smart metering as an example:

1) The Hardware diagnostic list may be used by the organisation maintaining the smart metering equipment in the field and would be used to diagnose and predict defects.

2) The equipment version list may be used by the organisation supplying updates of firmware/software to verify that the correct version of update was being applied.

3) The sensor list may contain sensor readings that will be used for analytic purposes.

4) The Private Personal List may be used with appropriate security controls to manage customer centric functions.

5) The sensor list (see 3 above) may be managed as a time series list, whereby sensor values are acquired at regular intervals (e.g. every 15 minutes) and placed into a multi-row time series list. Applications may then query the values as appropriate. For instance a meter reading application would query the device twice a day, and read all the time series data acquired throughout the preceding period.

In one aspect simple hierarchical data structures for M2M devices are mapped onto list structures using concepts that are common to relational databases. Many of the constructs familiar to SQL relational database programming can be incorporated into this aspect (e.g. the use of null values, reflection mechanisms, triggers, primary and foreign keys).

There are many features of this approach (please refer to the above clauses), that will make the application developers' use of data held in lists much easier. The idea could be implemented by the designers of hardware who would define the feature lists into the product, in order for third parties to make best use of the products. This could be implemented declaratively by the equipment developer, who would use an XML notation to describe the elements of each list and their properties. For example, a list item was a moving average, with a sample time of x, and with results to be normalised within a range a through b.

List management operations may use set theory constructs and so allow two lists to be queried as a Join (List 1+List 2) or an intersection (List 1 and List 2) or as a difference (List 1-List 2). This may make it easier for application developers to map data queries onto relevant data structures.

List management operations may use the relational (SQL) operations and constructs to query and modify data structures. List components may be mapped onto other data structures at the application level using relational operators and constructs. For example, Temperature Sensor readings may be mapped to a list element as a 30 day moving average. This may make it easier for product developers to present data for application use.

The DM platform may be described as a dataflow machine that uses set theory on input datasets to generate result sets that trigger additional activities (analytics, diagnostics and alerts).

FIG. 15 shows a schematic diagram of a system 600 for managing devices 120, 130, 140. The device manager or DMAP 60 is in communication with a memory store 605 that contains memory locations 610. The memory store 605 may take many alternative forms including relational database, file system, hard drive, distributed storage, flash memory, volatile memory or non-volatile memory, for example. Each memory location is associated with a device 120, 130, 140 that is being managed by the system 600. Each memory location is used to store one or more attributes 620.

The device manager 60 receives instructions or commands to take an action on the one or more stored attributes. For example, this may be to read, write, erase or update an attribute or group of attributes. The device manager 60 is also configured to receive from one or more devices 120, 130, 140 values or data that correspond with the stored attributes. A synchroniser 630 maintains synchronisation between the stored attributes and the attributes or values associated with each of the devices. The synchroniser 630 may be part of the device manager 60, separate or remote.

In other words, actions may be carried out on the attributes stored in memory and/or values may be received or retrieved from the physical devices 120, 130, 140. The synchroniser 630 ensures that stored attributes and the device values or attributes are maintained in synchronisation or updated to reflect any changes.

Figure 16:
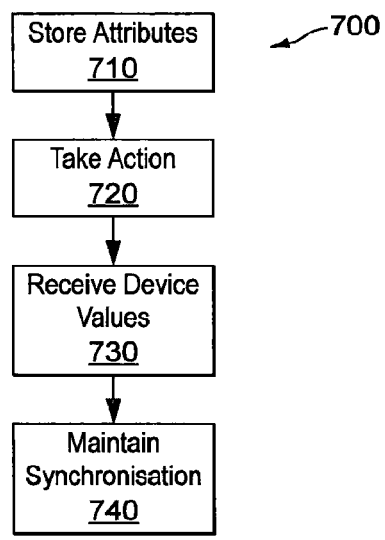
FIG. 16 shows a flowchart of an example method for managing devices.

FIG. 16 illustrates a method 700 for managing the one or more devices 120, 130, 140. At step 710 attributes are stored. This may be in the memory locations 610 of the memory store 605. Action is taken on these stored attributes by the device manager 60 at step 720. The device manager 60 receives device values or attributes from managed devices 120, 130, 140 at step 730. Synchronisation between the stored attributes 620 and attributes of associated devices 120, 130, 140 is maintained at step 740. It should be noted that steps 710, 720, 730 and 740 may take place in any order and any two or more of these steps may take place simultaneously. The method 700 may also iterate or continuously operate.

The computer system and architecture may include a processor such as a central processing unit (CPU). The processor may execute logic in the form of a software program. The computer system may include a memory including volatile and non-volatile storage medium. A computer-readable medium may be included to store the logic or program instructions. The different parts of the system may be connected using a network (e.g. wireless networks and wired networks). The computer system may include one or more interfaces. The computer system may contain a suitable operating system such as UNIX, Windows® or Linux, for example.

As will be appreciated by the skilled person, details of the above embodiment may be varied without departing from the scope of the present invention, as defined by the appended claims.

For example, the DM platform may be implemented in hardware using FPGAs.

Many combinations, modifications, or alterations to the features of the above embodiments will be readily apparent to the skilled person and are intended to form part of the invention. Any of the features described specifically relating to one embodiment or example may be used in any other embodiment by making the appropriate changes.

The invention claimed is:

1. A method for communicating between a managed device and a device manager, the method comprising:
   sending a message that is secured using Generic Bootstrapping Architecture (GBA) information or includes GBA push information to the managed device over a first communications channel; and
   in response to the message, initiating communication between the managed device and the device manager over a second communications channel that is of a different type than the first communications channel, wherein the first communications channel is a cellular channel and the second communications channel is non-cellular channel;
   wherein receipt of the message at the managed device additionally causes communications between the managed device and the device manager over a third communications channel to cease and switch to the second communications channel, wherein the third communications channel is different to the second communications channel; and
   wherein the message is sent to the managed device in response to: an increase in data volume; a request to send the managed device a file over a predetermined threshold; a request for a firmware or software update; an increase in electrical power used by the managed device over a predetermined threshold; and a decrease in data transfer rate below a predetermined threshold.

2. The method according to claim 1, wherein the second communications channel is secure and has a different security architecture to the first communications channel.

3. The method according to claim 1, wherein the first communications channel is within a first communications system and the second communications channel is within a second communications system different to the first communications system.

4. The method according to claim 1, wherein the message is SMS or mobile terminated SMS, SMS-MT, WAP-push, or OMA-push.

5. The method according to claim 1, wherein communications between the managed device and the device manager over the second communications channel are suspended until the message is received.

6. The method according to claim 1, wherein the managed device is in a dormant state until the message is received.

7. The method according to claim 1, wherein the message is a secured SMS message, and wherein the SMS message is secured using information established by GBA.

8. The method according to claim 1, wherein the message is an unsecured SMS messaged containing GBA push information, wherein the method further comprises confirming authenticity of the message using the push GBA information, and wherein communication between the managed device and the device manager over the second communications channel is initiated following successful authentication.

9. The method according to claim 1, wherein the first communication channel is used to establish cryptographic material to secure the second communication channel.

10. The method according to claim 1, wherein the managed device is a machine to machine (M2M) device.

11. A system for communicating between a managed device and a device manager, the system comprising:
a device manager;
a first communications channel;
a second communications channel that is different from the first communications channel; and
logic configured to:
send a message that is secured using Generic Bootstrapping Architecture (GBA) information or includes GBA push information to a managed device over the first communications channel; and
in response to the message, initiate communications between the managed device and the device manager over the second communications channel, wherein the first communications channel is a cellular channel and the second communications channel is non-cellular channel;
wherein receipt of the message at the managed device additionally causes communications between the managed device and the device manager over a third communications channel to cease and switch to the second communications channel, wherein the third communications channel is different to the second communications channel; and
wherein the message is sent to the managed device in response to: an increase in data volume; a request to send the managed device a file over a predetermined threshold; a request for a firmware or software update; an increase in electrical power used by the managed device over a predetermined threshold; and a decrease in data transfer rate below a predetermined threshold.

12. The system of claim 11, wherein the second communications interface is secure and has a different security architecture to the first communications interface.

13. The system of claim 11, wherein the first communications interface is configured to communicate with a first communications system and the second communications interface is configured to communicate with a second communications system different to the first communications system.

* * * * *